United States Patent
Larson et al.

(10) Patent No.: US 6,561,333 B2
(45) Date of Patent: May 13, 2003

(54) SPRING CLUTCH UTILIZING TORQUE SLIP CLIPS

(75) Inventors: George D. Larson, Roseville, MN (US); John Kossett, Vadnais Heights, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 0 days.

(21) Appl. No.: 09/897,379

(22) Filed: Jul. 2, 2001

(65) Prior Publication Data

US 2002/0007996 A1 Jan. 24, 2002

Related U.S. Application Data

(60) Provisional application No. 60/218,462, filed on Jul. 14, 2000.

(51) Int. Cl.$^7$ ............................................. F16D 7/02
(52) U.S. Cl. ................. 192/41 S; 192/33 C; 192/56.2; 192/80; 192/81 C
(58) Field of Search ............................ 192/41 S, 33 C, 192/56.2, 80, 79, 81 C

(56) References Cited

U.S. PATENT DOCUMENTS

| | | |
|---|---|---|
| 1,166,551 A | 1/1916 | Simmons |
| 2,462,304 A | 2/1949 | Burdick .................. 296/97 |
| 2,605,926 A | 8/1952 | Casey .................. 220/31 |
| 3,030,783 A | 4/1962 | Schmidt .................. 64/15 |
| 3,213,500 A | 10/1965 | Thompson .................. 24/73 |
| 3,395,553 A | 8/1968 | Stout .................. 64/15 |
| 3,724,134 A | 4/1973 | Verdone .................. 49/379 |
| 3,734,255 A * | 5/1973 | Ferraris .................. 192/36 |
| 3,765,054 A | 10/1973 | Johnson .................. 16/140 |
| 3,926,286 A * | 12/1975 | Johnson .................. 192/26 |
| 4,022,463 A | 5/1977 | Scott, Jr. .................. 272/136 |
| 4,133,074 A | 1/1979 | Schack .................. 16/180 |
| 4,158,271 A | 6/1979 | Barry .................. 49/386 |
| 4,190,929 A | 3/1980 | Palka .................. 16/169 |
| 4,192,099 A | 3/1980 | Simko et al. .................. 49/366 |
| 4,223,483 A | 9/1980 | Stafford .................. 49/385 |
| 4,227,283 A | 10/1980 | Mathewson et al. .................. 16/128 |
| 4,263,995 A | 4/1981 | Wahlstedt .................. 192/35 |
| 4,359,121 A | 11/1982 | Messner et al. .................. 180/69 |
| 4,377,019 A | 3/1983 | Takahashi .................. 16/307 |
| 4,419,789 A | 12/1983 | Matsui et al. .................. 16/308 |
| 4,423,535 A | 1/1984 | Ojima et al. .................. 16/85 |
| 4,580,315 A | 4/1986 | Beckwith .................. 16/308 |
| 4,685,658 A | 8/1987 | Keown .................. 267/80 |
| 4,688,961 A | 8/1987 | Shioda et al. .................. 403/389 |
| 4,768,317 A | 9/1988 | Markham .................. 52/74 |
| 4,785,501 A | 11/1988 | Obana .................. 16/308 |

(List continued on next page.)

OTHER PUBLICATIONS

Joseph Kaplan, "Slip Clutches and Brakes," *Machine Design*, Jan. 22, 1959, pp. 115–117.
Joseph Kaplan, "Spring Clutches," *Machine Design*, Apr. 19, 1956, pp. 107–111.
RPM's "High Inertia Slip Device," Jul. 13, 2000, literature p. 11.
RPM's "Model SC Slip Device," for products sold Jul. 13, 2000, literature.
RPM's "Model SA/SB High Intertia Slip Device," for products sold Jul. 13, 2000, literature.

*Primary Examiner*—Saúl Rodríguez
(74) *Attorney, Agent, or Firm*—Kinney & Lange P.A.

(57) ABSTRACT

The invention is a spring clutch mechanism including a first member and a second member coaxially disposed with respect to the first member where at least one of the first and second members is rotatable. A wrap spring assembly is in rotational engagement with the first member. At least one slip clip which has an outer axially extending surface and an axially extending aperture which forms an inner axially extending surface is disposed in rotational engagement between the second member and the wrap spring assembly.

29 Claims, 17 Drawing Sheets

U.S. PATENT DOCUMENTS

| | | | |
|---|---|---|---|
| 4,790,504 A | 12/1988 | Wills et al. | 248/183 |
| 4,888,921 A | 12/1989 | Markham | 52/63 |
| 4,908,906 A | 3/1990 | Hanna | 16/126 |
| 4,916,968 A | 4/1990 | Kabaya | 74/519 |
| 4,986,507 A | 1/1991 | Chiang | 248/291 |
| 5,010,983 A | 4/1991 | Kitamura | 188/67 |
| 5,018,244 A | 5/1991 | Hino | 16/342 |
| 5,028,025 A | 7/1991 | Herron et al. | 248/185 |
| 5,037,231 A | 8/1991 | Kitamura | 403/120 |
| 5,041,818 A | 8/1991 | Liu | 340/700 |
| 5,043,846 A | 8/1991 | Kinoshita | 361/394 |
| 5,052,078 A | 10/1991 | Hosoi | 16/297 |
| 5,064,137 A | 11/1991 | Komatsu | 242/201 |
| 5,088,156 A | 2/1992 | Hosoi | 16/342 |
| 5,108,062 A | 4/1992 | Detwiler | 248/185 |
| 5,133,437 A | 7/1992 | Larson | 192/12 |
| 5,197,704 A | 3/1993 | Kitamura | 248/292.1 |
| 5,211,368 A | 5/1993 | Kitamura | 248/292.1 |
| 5,219,240 A | 6/1993 | Kitamura | 403/84 |
| 5,231,734 A | 8/1993 | Rude | 16/342 |
| 5,235,494 A | 8/1993 | Chang et al. | 361/736 |
| 5,354,028 A | 10/1994 | Kitamura | 248/292.1 |
| 5,364,149 A | 11/1994 | Aymerich et al. | 296/97.12 |
| 5,394,650 A | 3/1995 | Dean | 49/386 |
| 5,467,504 A | 11/1995 | Yang | 16/342 |
| 5,491,874 A | 2/1996 | Lowry et al. | 16/342 |
| 5,613,275 A | 3/1997 | Kolberg et al. | 16/121 |
| 5,697,125 A | 12/1997 | Gannon | 116/342 |
| 5,771,152 A | 6/1998 | Crompton et al. | 361/681 |
| 5,771,539 A | 6/1998 | Wahlstedt et al. | 16/285 |
| 5,967,274 A | 10/1999 | Leone et al. | 192/35 |
| 6,047,805 A | 4/2000 | Nyquist et al. | 192/84.81 |

* cited by examiner

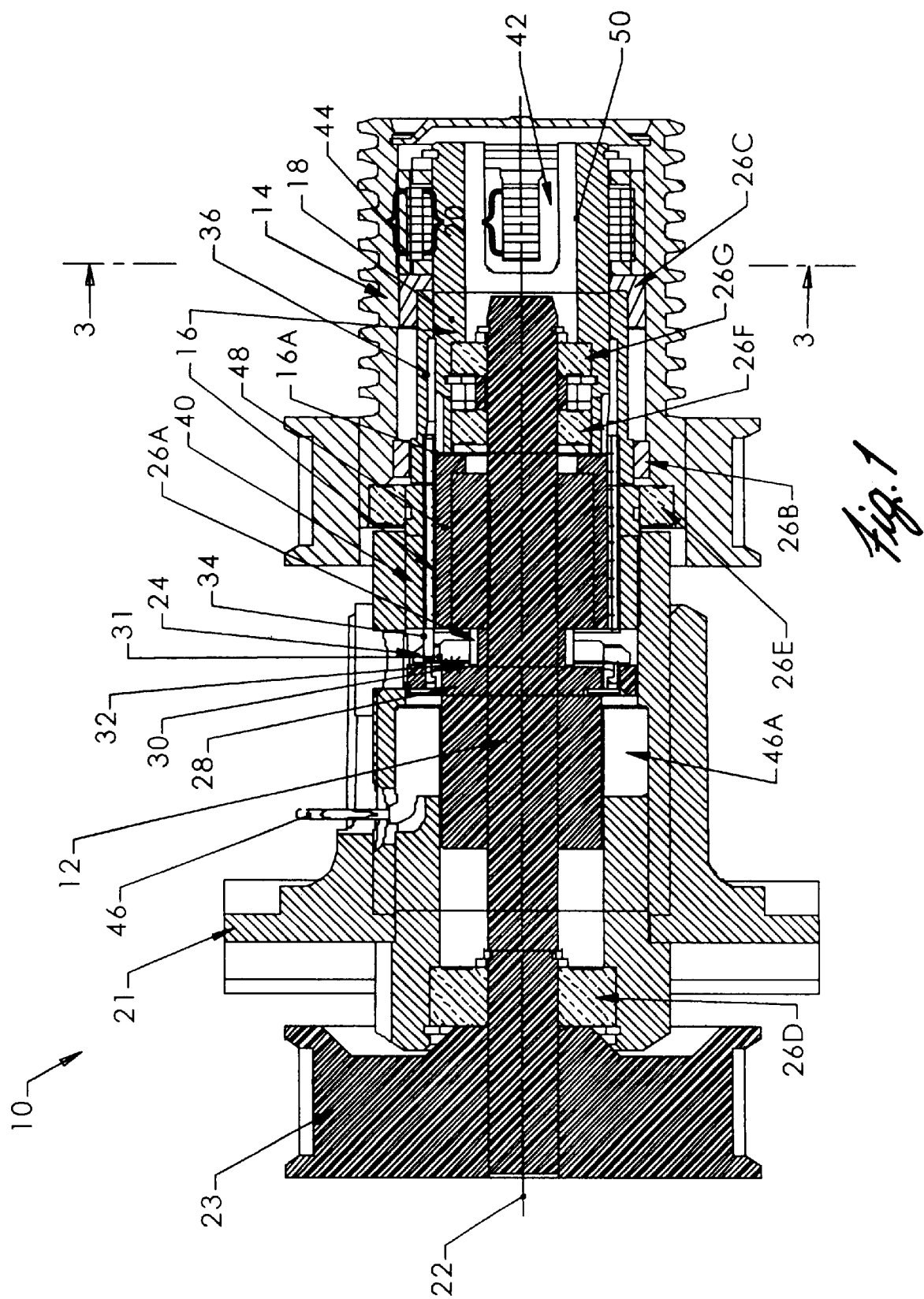

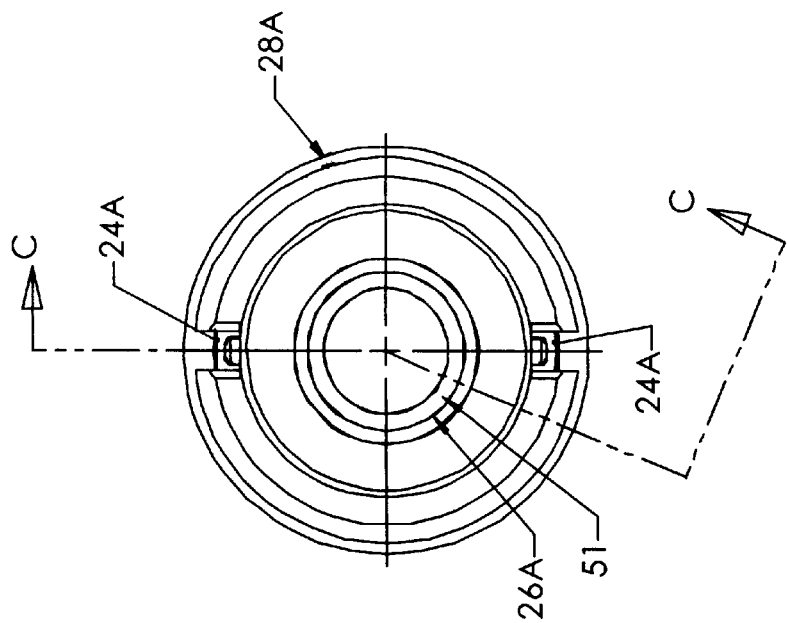
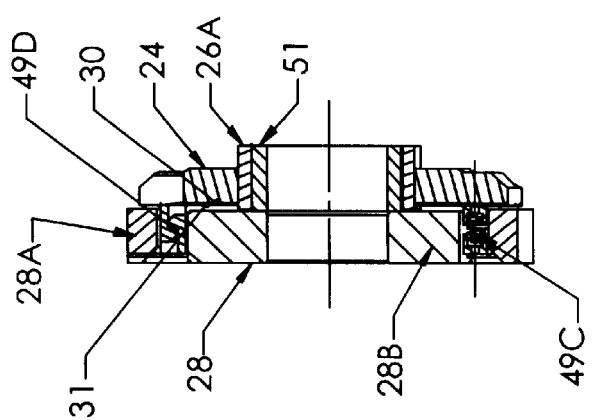
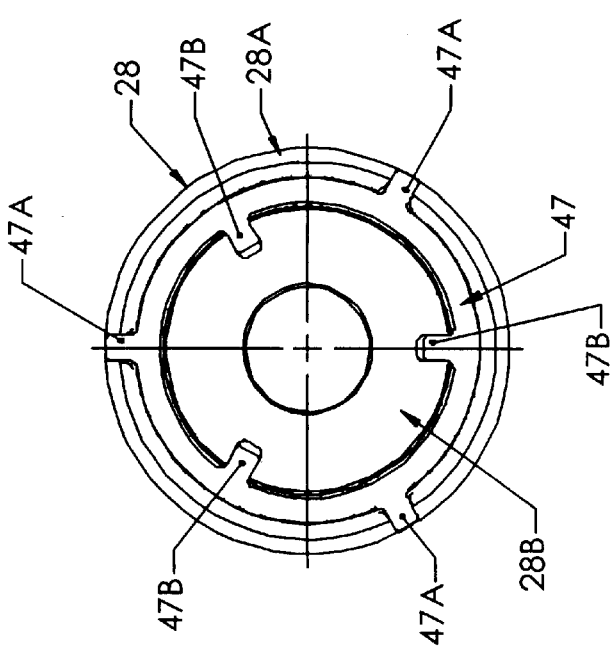

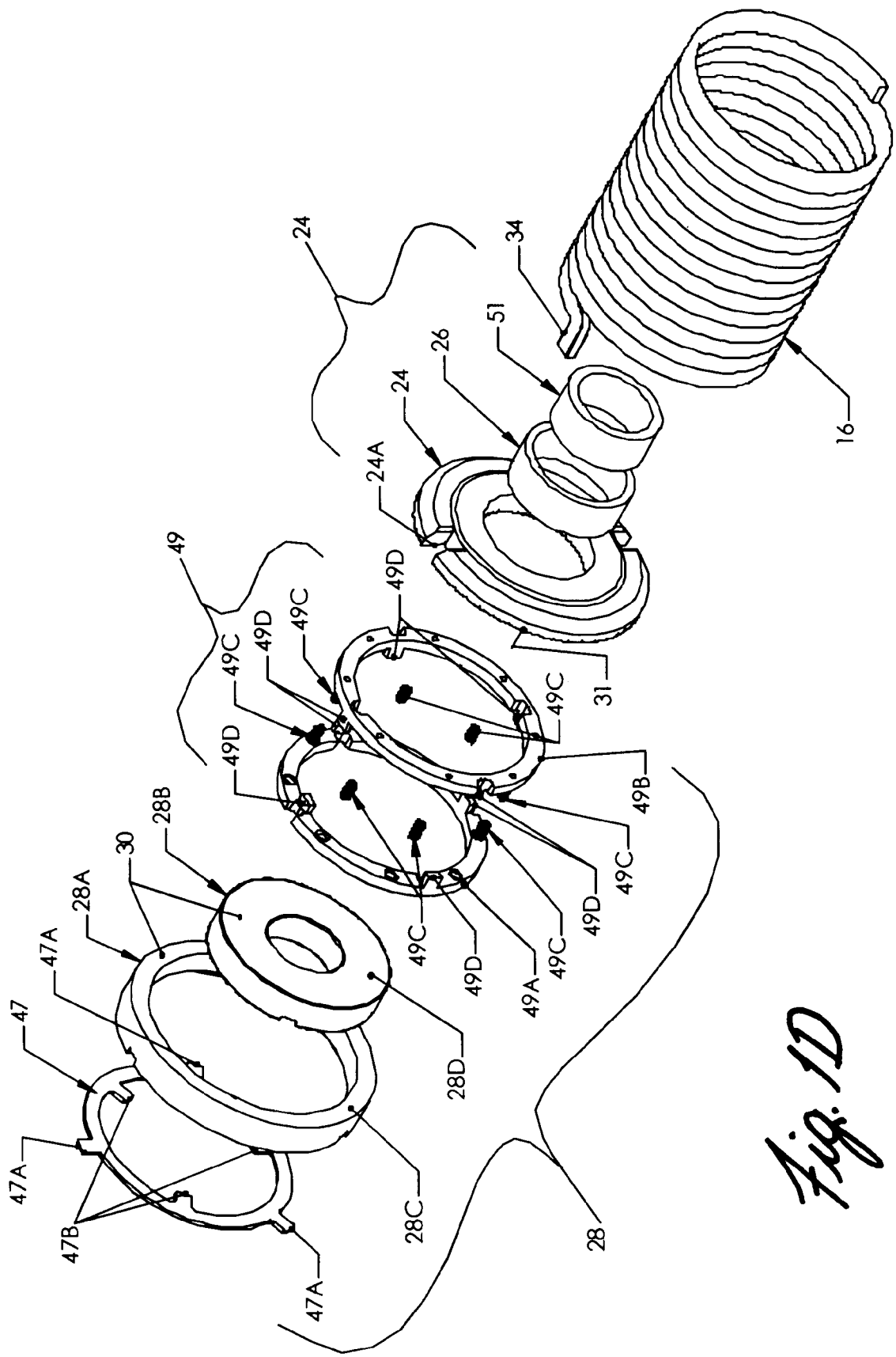

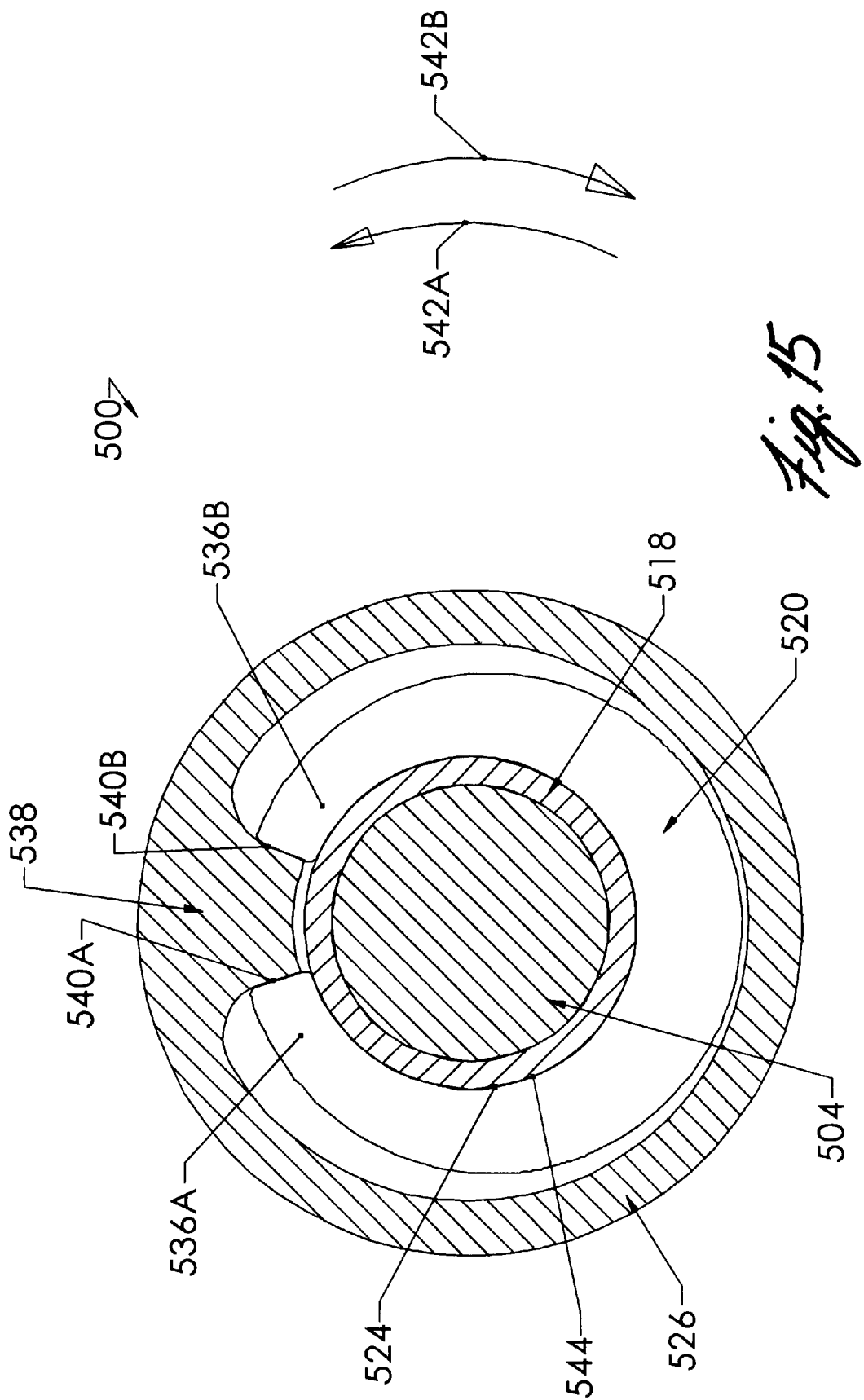

SPRING CLUTCH UTILIZING TORQUE SLIP CLIPS

CROSS-REFERENCE TO RELATED APPLICATION(S)

The application claims priority from U.S. Provisional Application Ser. No. 60/218,462 filed Jul. 14, 2000 for "SPRING CLUTCH UTILIZING TORQUE SLIP CLIPS" by George Larson and John Kossett, incorporated by reference in its entirety herein.

BACKGROUND OF THE INVENTION

The invention relates to a spring clutch which uses a spring to wrap onto a first member, thereby transferring torque between the first member and a second member. More particularly, the invention relates to the use of torque slip clips to provide an interface between the spring and the second member.

Many variations of spring clutches have been developed and are familiar to those skilled in the art. A typical spring clutch has (1) an input member to which an external source of motive force is connected, (2) an output member from which, when the clutch is engaged, torque can be transmitted to the connected load, (3) a spring which is used to connect the input and the output members, and (4) a control element by means of which the clutch is engaged or disengaged. Such a clutch is commonly called a wrap spring clutch because a spring is controllably wrapped either around or within the input or the output member. When the spring is caused to grip that member, the clutch can transmit torque and is said to be engaged. Conversely, when the spring is caused to be released from that member, the clutch will not transmit more than a small, residual amount of torque and is said to be disengaged. The control element is used to control the action of the spring, causing it to form the mechanical connection between the driving and the driven members when the clutch is engaged, and causing that connection to be substantially interrupted when the clutch is to be disengaged. The spring is either normally engaged or normally disengaged and the control element can be used to change the spring from the normal condition to the actuated condition.

One problem with the use of spring clutches is that in an application where a quick response is required between the engagement of the input member to the output member, a significant "line shock" (large amounts of force delivered to the spring in a very short time) can occur through the spring. Line shock increases as the inertia load on the output member is increased and/or as the response time (the time which it takes for the output member to be brought up to speed by the input member) is shortened since both of these require a high initial torque applied to the spring to rotate the output member. The result is that high levels of wear are generated by the frictional interference of the spring, high audible noise levels are generated by the clutch as it engages, and high levels of stress are imposed on the spring. In the past, to solve these problems, the size of the clutch was increased by utilizing large springs and wear inserts as load levels were increased.

Another problem associated with the use of spring clutches is their vulnerability to damage from overloading. Clutches are usually rated by the amount of torque which they are capable of transmitting. Most spring clutches are designed to be used only in situations in which the rated torque will not be exceeded. Spring clutches are usually damaged if the rated torque is exceeded by more than the safety margin designed into the clutch. Previous overload protection devices for spring clutches would not precisely actuate at an overload level. Additionally, previous overload protection devices were not available for applications requiring high torque levels. Thus, since dependable overload protection was not available, the capability of a spring clutch to withstand overload conditions depended upon a number of factors, including the physical size of the clutch. Specifically, by increasing the size and stiffness of the spring wire, the diameter of the element to which the spring makes a frictional connection when the clutch is engaged, and the size of the spring when it is in its relaxed condition, the clutch was able to withstand spikes of torque. Understandably, as the size of the elements of the clutch are increased the entire clutch got bigger.

Unfortunately, in many of the applications where it is desirable to use a spring clutch, physical space is at a premium. Therefore, there is a need in the art for providing a spring clutch capable of transferring high torque with a quick response and providing precise overload protection having the ability to actuate at higher torque levels which allows the use of a physically smaller clutch.

BRIEF SUMMARY OF THE INVENTION

The invention is a spring clutch mechanism including a first member and a second member coaxially disposed with respect to the first member where at least one of the first and second members is rotatable. A wrap spring assembly is in rotational engagement with the first member. At least one slip clip, which has an outer axially extending surface and an axially extending aperture which forms an inner axially extending surface, is disposed in rotational engagement between the second member and the wrap spring assembly.

BRIEF DESCRIPTION OF THE DRAWINGS

FIG. 1 is a longitudinal cross-sectional view of a first embodiment of the spring clutch.

FIG. 1A is an elevational view of the shoulder of the first embodiment of the spring clutch.

FIG. 1B is an elevational view of the shoulder and engaging ring of the first embodiment of the spring clutch.

FIG. 1C is a longitudinal cross-sectional view of the shoulder and engaging ring of the first embodiment of the spring clutch as taken along lines C—C of FIG. 1B.

FIG. 1D is an exploded perspective view of the shoulder, engaging ring and wrap spring of the first embodiment of the spring clutch.

FIG. 15 is a lateral cross-sectional view of the fifth embodiment of the spring clutch.

DETAILED DESCRIPTION

Figure 2:
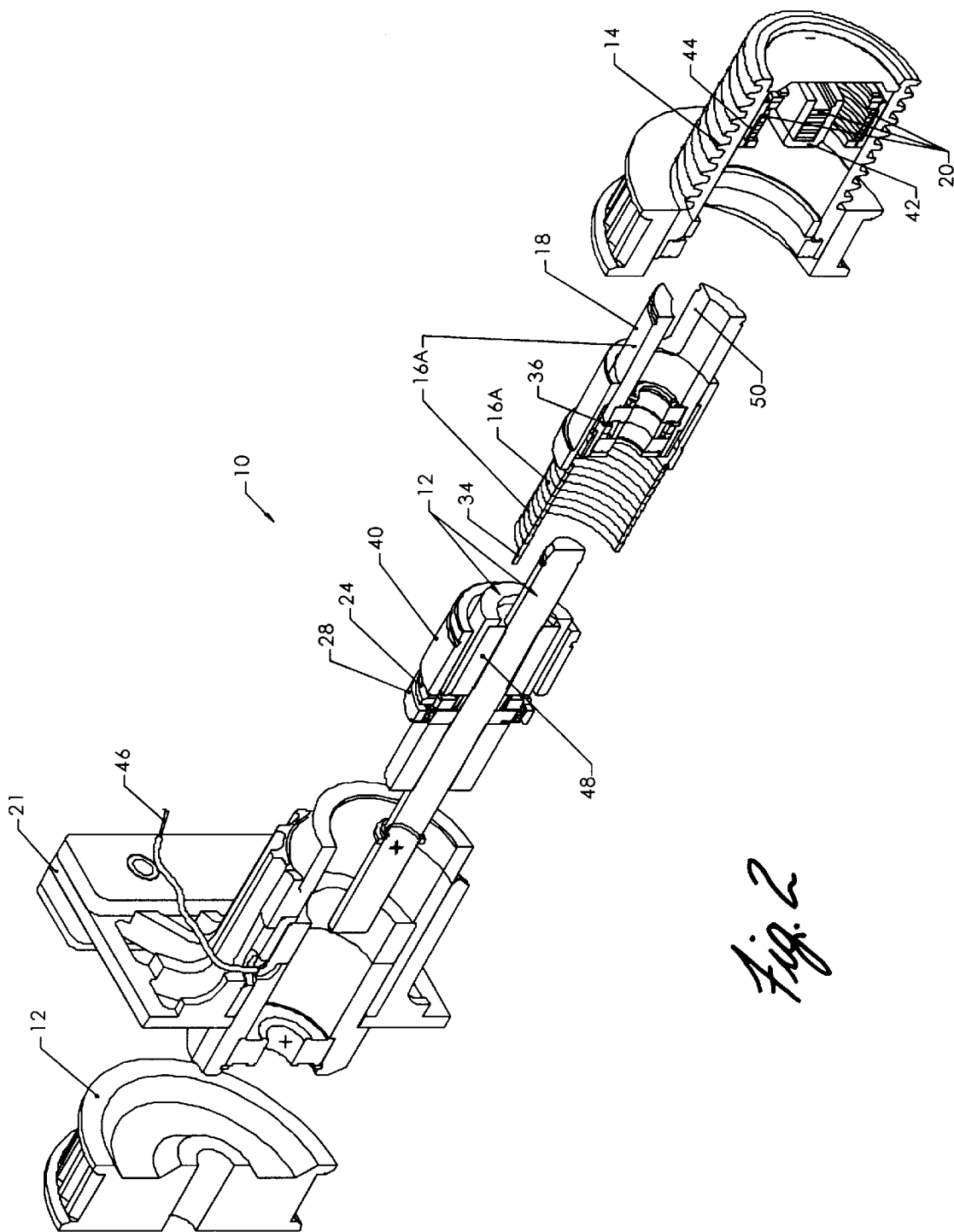
FIG. 2 is an exploded perspective longitudinal cross-sectional view of the first embodiment of the spring clutch.

The present invention is a spring clutch which allows for a transferral of high torque in a short response time in a more physically compact design than was previously available. The present invention prevents "line shock" from occurring when the clutch is engaged. The invention also provides reliable overload protection for a spring clutch which actuates at a precise level of torque. The level of torque allowed before the overload actuates may be set much higher than was previously available in similar package sizes.

The inventive spring clutch of the present invention has a power train which consists of an input member to which a motive force is applied, an output member from which motive force is connected, a spring assembly which provides a first link connecting the input and output members, and at least one torque slip clip which provides a second link connecting the input and the output members. In addition, a control element is typically included to engage or disengage the clutch.

The torque slip clips are interference fit with either the input or the output member (typically a shaft and a sleeve) and fixed (or restrained) in combination with the spring assembly with respect to the remaining member. The torque slip clips are placed either immediately "upstream" or immediately "downstream" from the spring in the power train.

Torque slip clips (clip members) have been used previously in laptop style personal computer applications as described in U.S. Pat. No. 5,697,125, incorporated by reference herein.

The slip clips are preferably generally U, C or O shaped, and provide a predictable (or "pre-determined") level of torque at which slippage will occur between each slip clip and the member with which the slip clip has been interference fit (or wrap spring assembly acting in combination with the member). The interference fit provides a resistance to rotation, or torque, from the slip clip to the input or output member. Thus, as the slip clip is rotated, friction between the interference fit member and the slip clip causes the interference fit member to tend to rotate with the slip clip (or vice versa, as the interference fit member is rotated, the slip clip is caused to tend to rotate).

The slip clip, however, is fixed with respect to the remaining member (or wrap spring assembly acting in combination with the member). As a result, when one member is rotating with respect to the other, the member which is rotating urges the slip clip to rotate to the same degree while the non-rotating member urges the slip clip to remain at rest. For example, if a shaft fixed to the slip clip is rotating while a sleeve interference fit to the slip clip is stationary, the static friction caused by the interference fit between the slip clip and the interference fit sleeve will impart a torque to the interference fit sleeve. If this torque is greater than the static torque load on the interference fit sleeve, the load will begin to rotate.

The level of interference between each slip clip and the interference fit member, the thickness and shape of the slip clip, and the number of slip clips used allow variations to the level of torque at which the slip clip will remain stationary with respect to the interference fit member. Above this "pre-determined" level, the plurality of slip clips will rotate (or "slip") with respect to the interference fit member. While the initial static friction between the interference fit member and the slip clips is overcome, kinetic friction, however, still provides a level of torque between the interference fit member and the slip clips thereby transferring a reduced level of acceleration or deceleration force between the clips and the interference fit member.

It should be understood that the slip clips can be designed in multiple geometries (in any embodiment of the wrap spring clutch) in order to accommodate the specific clutch system in which they are inserted. As previously mentioned, they may be generally U, C, and O shaped and may include dimensional variations across the width, length and thickness of each clip. Although the inner or outer surface of the clip will be substantially circular in shape to accommodate the interference fit (slipping) surface of the slipping member, the portion of the slip clip can vary greatly in shape to accommodate mounting. Variations can include utilizing a variety of flanges, grooves, knurling, interlocks and fasteners to secure the fixed member to the slip clips, as well as altering the shape of the internal aperture or outer surface so as to conform to the shape of the fixed member (e.g. utilizing an octagonal shaped aperture in conjunction with an octagonal shaft or utilizing multiple apertures in conjunction with split or multiple shafts).

Additionally, as will be discussed with respect to the embodiments described below, the clips may be designed to be interference fit (slip fit) along an inner diameter surface (defined by an internal aperture) and fixably mounted along an outer circumference (as by use of a flange extending from the outer surface which can be interlocked to the fixed member), or alternatively may be interference fit (slip fit) along the outer surface and fixably mounted along the inner diameter surface (again one mounting possibility could be through a flange, tab or spar extending into the internal aperture and interlocked to the fixed member).

Therefore, using torque slip clips allows the input member to be subjected to a much higher level of torque with respect to the output member without causing damage to the input member, the output member, the spring, or any other component of the clutch. The slip clips provide a dampening effect in quick response applications which require a high level of initial torque. The slip clips eliminate the "line shock" associated with starting and stopping the clutch and allow the use of smaller parts which do not require a high level of strength, since the greatest torques (and stresses) occur during very short periods of time and rapidly decrease, Additionally, the slip clips provide for overload protection. If the output member is prevented from rotating due to an unexpected failure, the input member can still rotate for a time period. The level of torque required to rotate the output member will exceed that of the torque provided by the slip clip to the interference fit member, providing a point in the power train which will allow for the rotation of the input member with respect to the output member without causing instantaneous damage to the clutch.

Using the torque slip clip in series in the power train of a clutch has multiple advantages. The torque slip clip is the most reliable and highest torque density slip torque device available. Production tolerances of the slip clip are superior to most alternatives for positioning and drive train torque requirements. The clip "slip torque" is insensitive to short term heat spikes. Heat dissipation and life can be further extended by clip geometry, material selection and package size design. The slip clips provide consistent bi-directional torque, meaning the slip torque is consistent regardless of which way the clip is rotated with respect to the member with which it is interference fit. Production of the slip clips can occur at very low costs for high volumes. When torque slip clips are interference fit about the outer diameter of the clip, they maintain high heat capacity and wear life. When torque slip clips are interference fit in the inner diameter of the clip, they have a very high torque density. Slip torque is not affected by clutch wear or heat as is the case in many other clutch types. Finally, when utilizing slip clips, a low level of electrical power is consumed per unit of clutch torque. It should be noted that the terms "first member" and "second member" are each interchangeable with any of the terms "input member", "output member", "driving member" and "driven member" (i.e., "first member" could refer to either "input member" or "output member").

One embodiment of the inventive spring clutch is shown at 10 in FIG. 1. Spring clutch 10 includes input shaft assembly (input member) 12, output member assembly 14, wrap spring assembly 16 which includes wrap spring 16A and driver 18. Spring clutch 10 includes slip clips 20 and housing 21. It should be noted that FIG. 1 shows a cross-section of the annular clutch and most of the components identified are identical on both sides of longitudinal axis 22 of the clutch 10.

An input source of rotational motion (not shown) is coupled to input shaft assembly 12 along pulley 23. Engaging ring (or control element) 24 is supported on input shaft assembly 12 by bushing 26A. Bushing 26A allows engaging ring 24 to rotate freely with respect to input shaft assembly 12. Additional bushings 26B and 26C and bearings 26D, 26E, 26F and 26G are utilized throughout the clutch to provide rotation between various elements of clutch 10. Shaft shoulder 28 defines shoulder face 30 on shaft assembly 12. Shoulder face 30 is separated from engaging face 31 on engaging ring 24 by air gap 32.

Wrap spring 16A includes ring end 34 and driver end 36. Ring end 34 is fixably attached to engaging ring 24, and driver end 36 is fixably attached to driver 18. Spring 16A is biased so as to frictionally engage clutch support structure (or grounding hub 40). Additionally, the initial bias of wrap spring 16A does not allow wrap spring 16A to engage input shaft assembly 12.

Driver 18 is fixedly attached to driver insert 42 (preferably manufactured from an elastic material such as urethane) which in turn is fixedly attached to slip clips 20. Slip clips 20 are interference fit with output member assembly 14 along slip face 44.

Electrical leads 46 bring electricity to coil 46A. When electricity is applied to coil 46A, shoulder 28 becomes magnetized, pulling engaging ring 24 through air gap 32 and magnetically coupling engaging ring 34 to the shoulder 28. The magnetic attraction between shoulder face 30 of shoulder 28 and engaging face 31 of engaging ring 24 provides a high transfer of torque to spring end 34.

FIG. 1A shows a view of shoulder 28. FIGS. 1B and 1C show a detailed view of shoulder 28 and the engaging ring 24. In particular, FIG. 1C shows a view as taken along C—C of FIG. 1B. FIG. 1D shows an exploded view of shoulder 28 and engaging ring 24. Shoulder 28 is preferably comprised of outer shoulder 28A and inner shoulder 28B which are interconnected by flat spring 47, best shown in FIG. 1D.

Outer tabs 47A on flat spring 47 are secured to outer shoulder 28A and inner tabs 47B on flat spring 47 are secured to inner shoulder 28B. Flat spring 47 is adapted to engage inner and outer shoulders 28A and 28B so that when shoulder 28 and engaging ring 24 are uncoupled, outer shoulder 28A is disposed slightly forward (to the right with respect to FIG. 1D) of the inner shoulder 28B.

Lift spring assembly 49 is disposed between outer shoulder 28A and inner shoulder 28B. Lift spring assembly 49 includes first and second lift rings 49A and 49B and lift springs 49C. Lift rings 49A and 49B are interconnected by opposing latches 49D. Opposing latches 49D allow lift rings 49A and 49B to travel a predetermined distance from each other. Lift springs 49C are biased so as to maintain this predetermined distance between first and second lift rings 49A and 49B when engaging ring 24 and shoulder 28 are not coupled.

Engaging ring 24 includes toe slots 24A for fixing wrap spring 16 to engaging ring 24. Bushing 26A acts as a bearing means for engaging ring 24. Bushing 26A is preferably plastic and "free floating". To be "free floating", bushing 26A is sized so that clearance is provided between engaging ring 24 and bushing 26A. The clearance allows bushing 26A to rotate with respect to both engaging ring 24 and input shaft assembly 12. Inner bushing 51 is preferably mounted between bushing 26A and input shaft assembly 12 so as to rotate freely with respect to bushing 26A.

Thus, shoulder face 30 of shoulder 28 is actually a combination of outer and inner faces 28C and 28D. When engaging ring 24 is in the "uncoupled" position, second lift ring 49B acts to prevent the engaging ring 24 from accidentally engaging outer shoulder 28A. Lift rings 49A and 49B are preferably comprised of plastic to provide a soft wear surface against the engaging ring 24.

Upon magnetizing shoulder 28, engaging ring 24 is pulled towards shoulder 28. Engaging ring 24 first engages second lift ring 49B and overcomes the spring force of lift springs 49C. Lift springs 49C are compressed until engaging ring 24 contacts outer shoulder 28A (which is disposed forward of inner shoulder 28B by flat spring 47). Next, the magnetic attraction between engaging ring 24 and shoulder 28 overcomes the spring force of flat spring 47 and outer shoulder 28A is translated backward (to the left, looking at FIG. 1) until its outer face 28C is in the same plane as outer face 28D of inner shoulder 28B forming shoulder face 30. In the magnetically coupled state, engaging face 31 is substantially contiguous with shoulder face 30.

When the electric current is removed from clutch 10, the magnetic flux of shoulder 28 begins to dissipate, causing flat spring 47 to overcome the magnetic attraction between shoulder face 30 and engaging face 31. Flat spring 47 pushes outer shoulder 28A forward creating air gap 32 between inner shoulder 28B and engaging face 31 which further dissipates magnetic flux. Finally, lift spring assembly 49, via lift springs 49C, forces engaging face 31 away from outer shoulder 28A disengaging engaging ring 24 from shoulder 28. Thus, shoulder 28 assists wrap spring 16A in stopping the driving action from the input shaft assembly 12 to the output member assembly 14 by quickly disengaging the engaging ring 24 from shoulder 28, thereby increasing performance of the clutch 10.

When engaging ring 24 and shoulder 28 become magnetically coupled through magnetization of shoulder 28, engaging ring 24 begins to rotate at the same rate as input shaft assembly 12. As best illustrated in FIG. 2, the connection between ring end 34 of wrap spring 16A and engaging ring 24 causes the rotation of ring end 24 while the connection between driver end 36 of wrap spring 16A and driver 18 does not. Spring 16A is caused to contract and wrap around input shaft assembly 12 at wrap hub portion 48. Wrap spring 16A frictionally engages wrap hub portion 48 facing driver end 36 of wrap spring 16A to urge driver 18 to rotate in the same direction and at the same speed as input shaft assembly 12.

Driver 18 in turn forces the rotation of slip clips 20 by the fixed engagement between driver insert 42 and driver 18 at driver face 50 (slip clips 20 are located "downstream" from spring assembly 16). Slip clips 20 rotate at the same speed as driver 18 and provide a predetermined level of torque to output member assembly 14 at slip face 44. As discussed previously, if the initial inertia of output member assembly 14 is such that the torque required to rotate output member 14 exceeds that of the predetermined level allowed by the static friction of the interference fit between slip clips 20 and output member assembly 14, slip clips 20 will "slip" at slip face 44. Friction still exists between the output member assembly 14 and the slip clips 20, however, and the inertia of output member assembly 14 will gradually (relative to a fixed connection between the output member assembly 14 and driver 18) be overcome until the torque required to rotate output member assembly 14 dips below the predetermined level at which slip clips 20 slide with respect to output member assembly 14. Slip clips 20 then maintain a constant rotational position with respect to output member 14.

Once the current is removed from electrical leads 46, the magnetic attraction between shoulder 28 and engaging ring 24 is broken. Engaging ring 24 uncoupled from shoulder 28 and the bias of wrap spring 16A causes it to unwrap from the wrap hub portion 48 of input shaft assembly 12. Wrap spring 16A unwraps from wrap hub portion 48 until it frictionally engages support structure 40. The frictional engagement of wrap spring 16 with support structure 40 provides a counter rotational force to driver 18 which is transferred through slip clips 20 to output member assembly 14, Slip clips 20 are preferably bi-directional, meaning they have the same slip torque level in both directions. Due to their bi-directional nature, the high level of torque required to stop output member assembly 14 will exceed the pre-determined slip torque level, and output member 14 will rotate with respect to slip clips 20 at slip face 44 until the torque level between the two decreases to the slip torque, at which point output member assembly 14 will stop rotation with respect to slip clips 20 (and with respect to wrap spring assembly 16 and support structure 40). In one embodiment, the slip clips provide a predetermined level of torque of approximately 100 lb-in. at which they slip with respect to output member 14.

Output member assembly 14 is preferably a pulley sleeve which allows for belts to be attached from output member 14 to a load (not shown). Spring clutch 10 allows a quick starting of output member 14 without unduly stressing wrap spring 16. Without slip clips 20, audible noise generated by spring clutch 10 is approximately 105 decibels at maximum cycle rate. This noise is caused primarily by wrap spring 16A becoming contorted by the opposing inertia of input and output members 12 and 14 and subsequently striking wrap hub portion 48 and support structure 40 on each clutch engagement and disengagement. For example, a spring clutch, without slip clips, will accelerate the output member from 0 rpm to 1000 rpm in 0.5 milliseconds. The level of noise is reduced to approximately 90–95 decibels when slip clips 20 are used. With the slip clips, as clutch 10 is engaged, slip clips 20 typically rotate approximately twenty to thirty degrees with respect to output member assembly 14 as the torque between the two exceeds and then recedes to the pre-determined slip torque. The time it takes for the output member assembly to accelerate to the speed of the input shaft assembly (0–1000 rpm) or decelerate to a stationary position (1000–0 rpm) using slip clips in the spring clutch, is preferably approximately 5 milliseconds.

Figure 3:
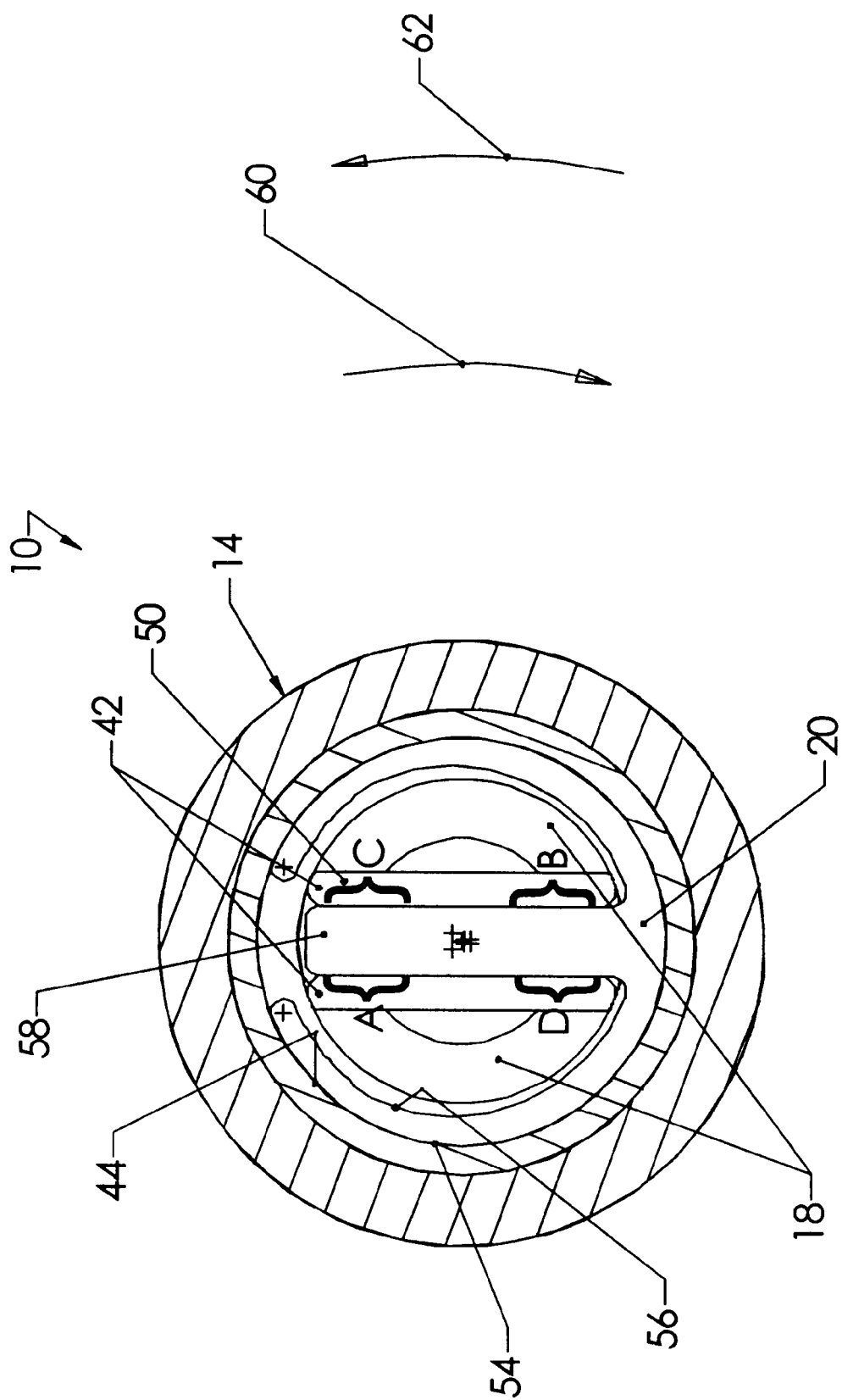
FIG. 3 is a lateral cross-sectional view of the first embodiment of the spring clutch.

As illustrated in FIG. 3, the slip clips 20 are interference fit into output member assembly 14 along slip face 44. In the present embodiment, the slip face 44 is an inner diameter face of output member assembly 14. Slip face 44 engages slip clips 20 along an outer diameter (OD) face 54 of the slip clips 20. Inner diameter (ID) face 56 of slip clips 20 are not engaged with the output member assembly 14. In one embodiment, outer diameter of slip clips 20 is approximately 1.54 inches when not interference fit into output member assembly 14. Output member assembly 14 has a diameter of 1.50 inches at slip face 44, forming the interference fit with slip clips 20. It should be noted that alternate embodiments of spring clutch 10 may utilize ID face 56 to engage output member 14, as discussed further below.

Slip clips 20 additionally comprise internal spar 58 which is fixedly coupled to driver insert 42. Driver insert 42 is typically slip fit between driver 18 and slip clip internal spar 58. As driver insert 42 is rotated by driver 18 in the direction of arrow 60, internal spar 58 is engaged by driver insert 42 at sections "A" and "B". The elasticity of driver insert 42, provides an equal moment to opposite sides of internal spar 58 along a length of spar 58. The equal application of the moment along a length of spar 58 by driver insert 42 lessens the likelihood that spar 58 will fail by dividing the rotational force provided by driver 18 to slip clips 20 along the length of spar 58. Similarly, when driver insert 42 is rotated in the opposite direction (arrow 62) a force is applied to sections "C" and "D" of spar 58, once again distributing the forces and preventing breakage of spar 58.

Other configurations of slip clips 20 will also function in accordance with the present invention. For example, slip clip 20 could also have a circular ID face, interference fit with an OD face of driver 18. Each slip clip 20 could further have a flange in its OD face that is fixed engaged with output member assembly 14. In this way, clips 20 would slip relative to driver 18 (instead of output member assembly 14) when the friction of the interference fit is less than the torque load. The slip clips 20 would be rotationally fixed relative to the output member assembly 14. Additional slip clips can be added to increase the surface area of the OD face, thereby increasing the level of torque at which the slip clips 20 "slip" with respec to the output member assembly 4.

Figure 4:
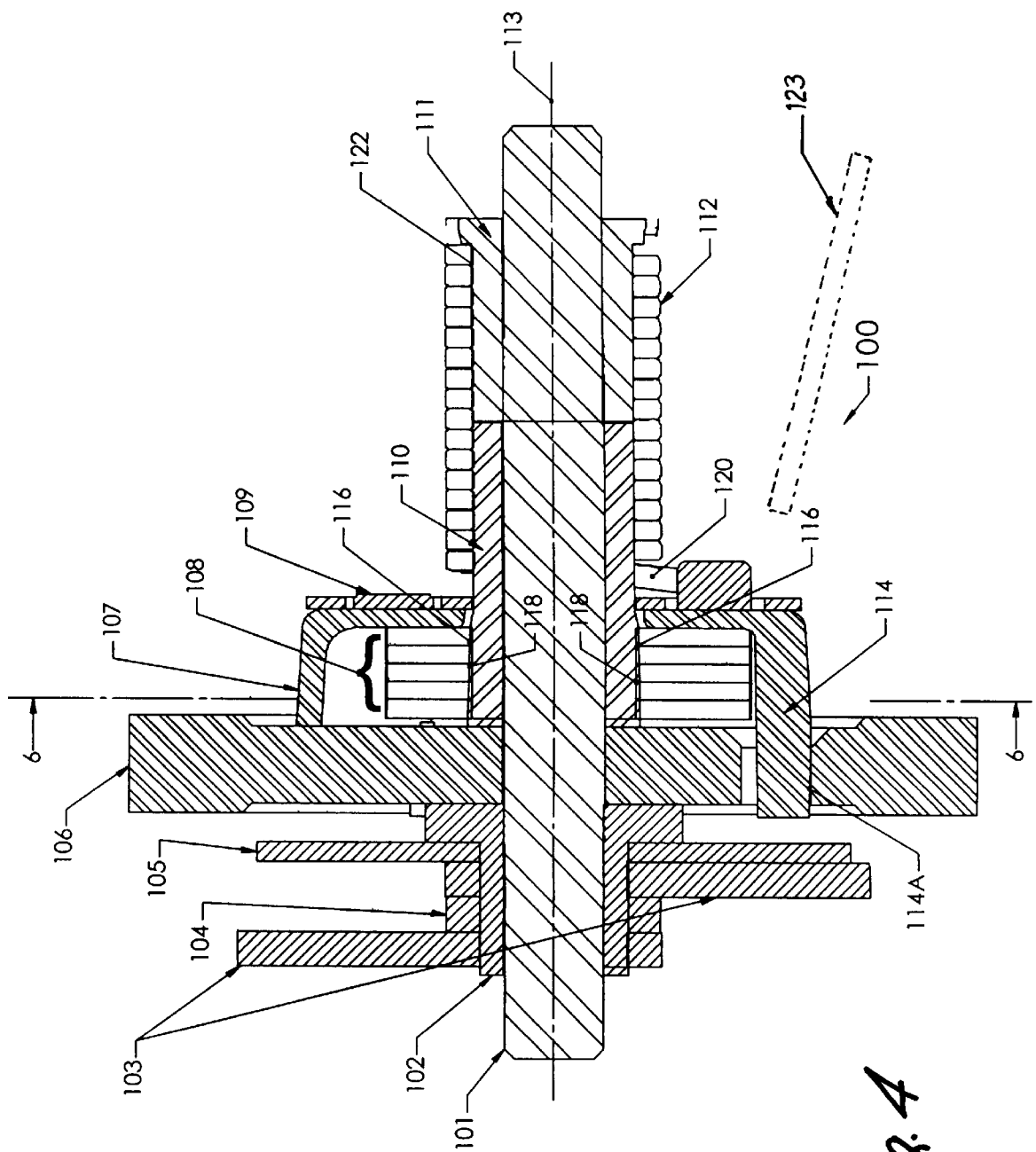
FIG. 4 is a longitudinal cross-sectional view of a second embodiment of the spring clutch.
Figure 5:
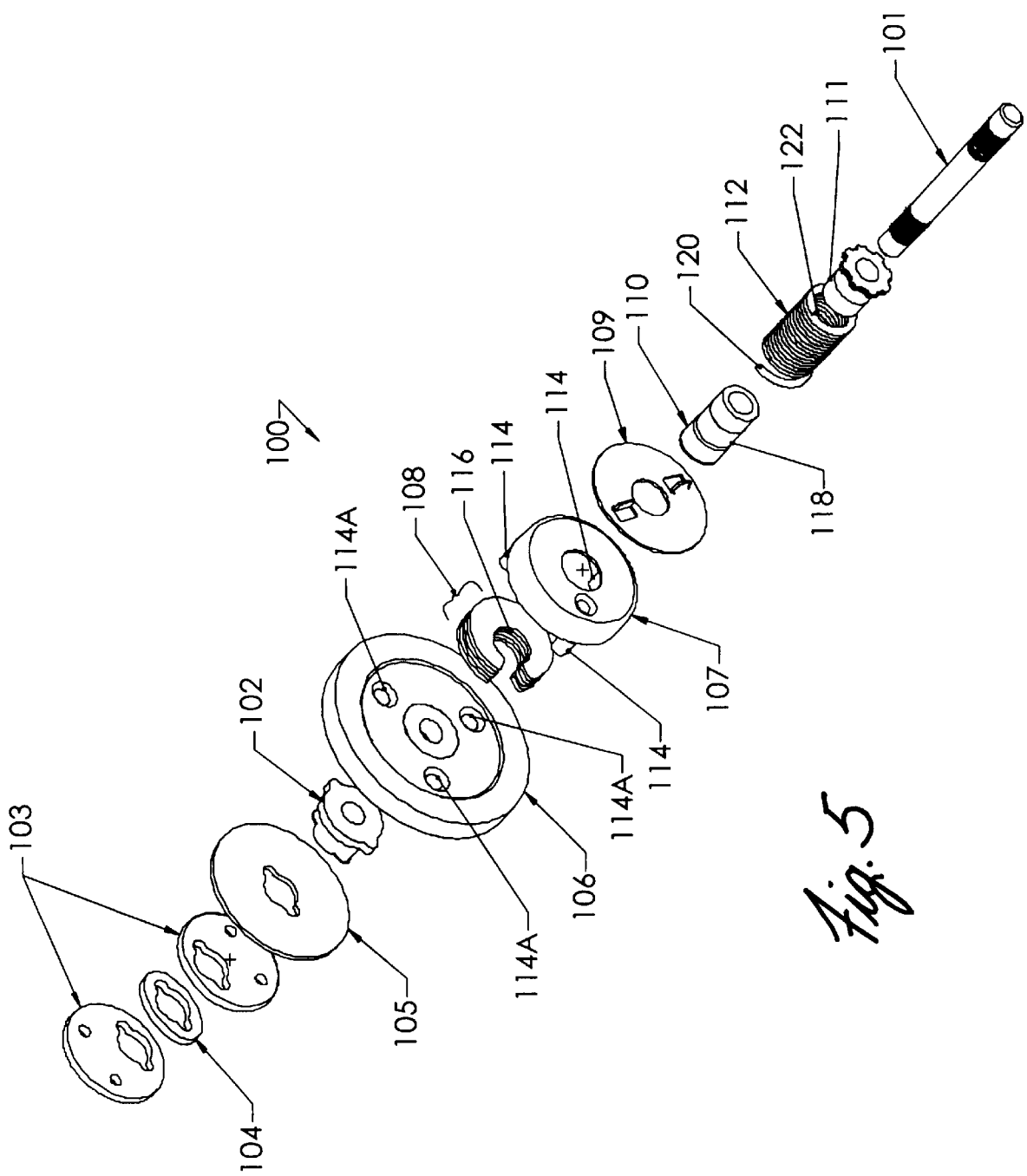
FIG. 5 is an exploded perspective view of the second embodiment of the spring clutch.
Figure 6:
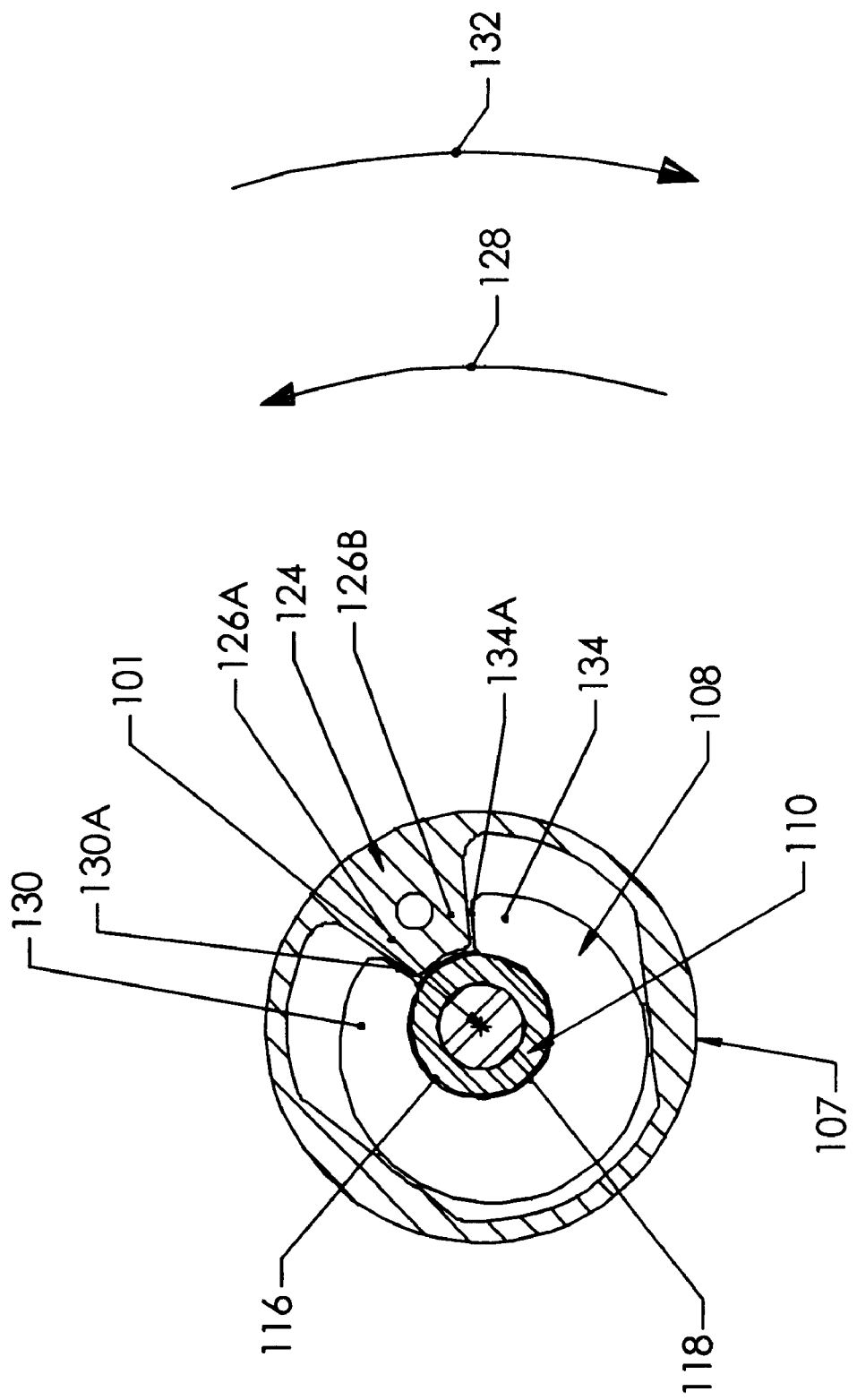
FIG. 6 is a lateral cross-sectional view of the second embodiment of the spring clutch.

FIGS. 4, 5 and 6 illustrate an alternate embodiment of the inventive spring clutch at 100. FIG. 4 illustrates spring clutch 100 in cross-section and FIG. illustrates an exploded view of spring clutch 100. Spring clutch 100 includes output shaft 101, collar eccentric 102, eccentrics 103, spacer 104, plate 105, input gear 106, clip holder 107, plurality of slip clips 108 (five are illustrated), release sleeve 109, hub 110, hub collar 111 and spring 112. Longitudinal axis 113 of spring clutch 100 extends along output shaft 101.

Input gear 106 is rotatably driven by an external force (not shown) about longitudinal axis 113. Clip holder 107 is rotatably coupled to input gear 106 by extending leg 114 (fixed to clip holder 107) through aperture 114A in input gear 106. Thus, input gear 106 and clip holder 107 constitute the "input member" portion of spring clutch 100. Clip holder 107 is in fixed rotational engagement with slip clips 108 (as discussed further with respect to FIG. 6).

Inner diameter face 116 of slip clips 108 engages hub 110 at slip face 118. Input gear 106 and hub 110 are able to rotate freely with respect to shaft 101. Spring 112 is rotatably coupled to hub collar 111 which in turn is in fixed rotational engagement with output shaft 101. Output shaft 101 is rotationally coupled to collar eccentric 102, eccentrics 103, spacer 104 and plate 105, which are used to actuate an external mechanism, such as the shears of a hedge trimmer (not shown). Thus, output shaft 101 and hub collar 111 (and by interconnection, collar eccentric 102, eccentrics 103, spacer 104 and plate 105) form the "output member". Wrap spring 112 and hub 110 form the "wrap spring assembly".

As input gear 106 rotates, it drives clip holder 107. Since clip holder 107 is rotatably fixed to slip clips 108, slip clips 108 are always rotating when input gear 106 is rotating (slip clips 108 are positioned "upstream" from spring 112). This is different from the previous embodiment described with respect to FIG. 1 where the slip clips were positioned "downstream" from the wrap spring assembly. In the previous embodiment, the wrap spring assembly was fixed rotationally with respect to the slip clips. In the embodiment illustrated in FIGS. 4–6, slip clips 108 are interference fit with hub 110 (i.e., the "wrap spring assembly" is interference fit with the slip clips). As mentioned, hub 110 freely rotates about output shaft 101. Spring 112 has an initial bias which frictionally engages it with hub 110 at hub end 120 of spring 112 and hub collar 111 at collar end 122 of spring 112. In other words, spring 112 is biased into a "wrapped" position. As hub 110 is rotated by slip clips 108 (due to the frictional interference fit between the slip clips 108 and the hub 110), hub end 120 of spring 112 is rotated, rotating collar end 122 of spring 112 and hub collar 111. The friction grip between wrapped spring 112, hub 110 and hub collar 111 causes all three to rotate together. Output shaft 101 is press fit into hub collar 111 so that output shaft 101 is rotated, driving eccentrics 103.

In this embodiment, slip clips 108 particularly act as overload protection for spring clutch 100. If the load (not shown) connected to output shaft 101 (through eccentrics 103) "locks" output shaft 101 such that it cannot turn, ID face 116 of slip clips 108 will exceed a pre-determined torque level (for example approximately 600 lb-in., and "slip" or rotate with respect to slip face 118 of hub 110, thereby preventing damage to any of the internal clutch components (e.g., shearing of output shaft 101).

Release sleeve 109 is disposed between clip holder 107 and spring 112 annularly about output shaft 101. Release sleeve 109 rotates freely with respect to clip holder 107, hub 110 and shaft 101, however, during operation, hub end 120 of spring 112 will engage tab 109A during rotation, causing the rotation of release sleeve 109. To uncouple the "input member" from the "output member", an externally-fixed member (such as pin 123, shown in dotted lines) is positioned to engage tab 109A, and prevent release sleeve 109 from rotating. Since tab 109 is prevented from rotating, hub end 120 of spring 112 is prevented from rotating. Since the collar end 122 of spring 112 continues to rotate, the spring 112 begins to "unwind" starting from hub end 120, disengaging from hub 10 to the extent that hub 110 is not frictionally gripped by spring 112 to present a driving force to spring 112. Spring 112 primarily is loosened from hub 110, so that although the frictional grip of spring 112 onto the hub collar 111 is lessened, enough friction remains for spring 112 to slow and stop the rotation of hub collar 111 and shaft 101. This type of wrap spring connector is commonly know as a "roaming spring". Since controlling the engagement of the clutch 100 involves unwrapping spring 112 from hub 110, the "wrap spring assembly" portion of spring clutch 100 can be said to internally unwrap.

FIG. 6 is a section view illustrating the connection of slip clips 108. Clip holder 107 includes retaining member 124 having first and second shoulders 126A and 126B. As clip holder 107 is rotated (indicated by arrow 128) first shoulder 126A of retaining member 124 engages first leg 130 of slip clip 108 along radially extending face 130A of first leg 130.

Slip clip 108 is forced to rotate in the same direction. Thus, clip holder 107 (and gear 106 by inter connection) is in fixed rotational engagement with slip clip 108. Slip clip 108 is interference fit to hub 110 at inner diameter face 116 of slip clip 108 and slip face 118 of hub 110. The interference fit urges hub 110 to rotate in the direction of arrow 128. If the torque required to rotate hub 110 exceeds the predetermined "slip torque" of the interference fit, hub 110 will slip (i.e., not be in complete fixed rotational engagement) with respect to slip clip 108 (as discussed previously with respect to the first embodiment described). It should be noted that rotation may occur in the opposite direction (as indicated by arrow 132) as well. When clip holder 107 is rotated in the direction of arrow 132, radially extending face 134A of second leg 134 is engaged by second shoulder 126B of clip holder 107, causing fixed rotational engagement between clip holder 107 and slip clip 108.

It should be noted that the interference fit in the embodiment shown in FIGS. 4–6 occurs on the inner diameter face 116 of the slip clip 108 and the clip 108 is "upstream" from the spring 112. The spring clutch embodiment 10 discussed with respect to FIGS. 1, 1A–1D, 2 and 3, on the other hand, shows an interference fit with outer diameter face 54 of slip clip 20. Additionally, slip clip 20 is "downstream" from spring 16 with respect to the "input member". Thus, it should be apparent that multiple variations are available for placement of the slip clip in the power train of the spring clutch.

Figure 7:
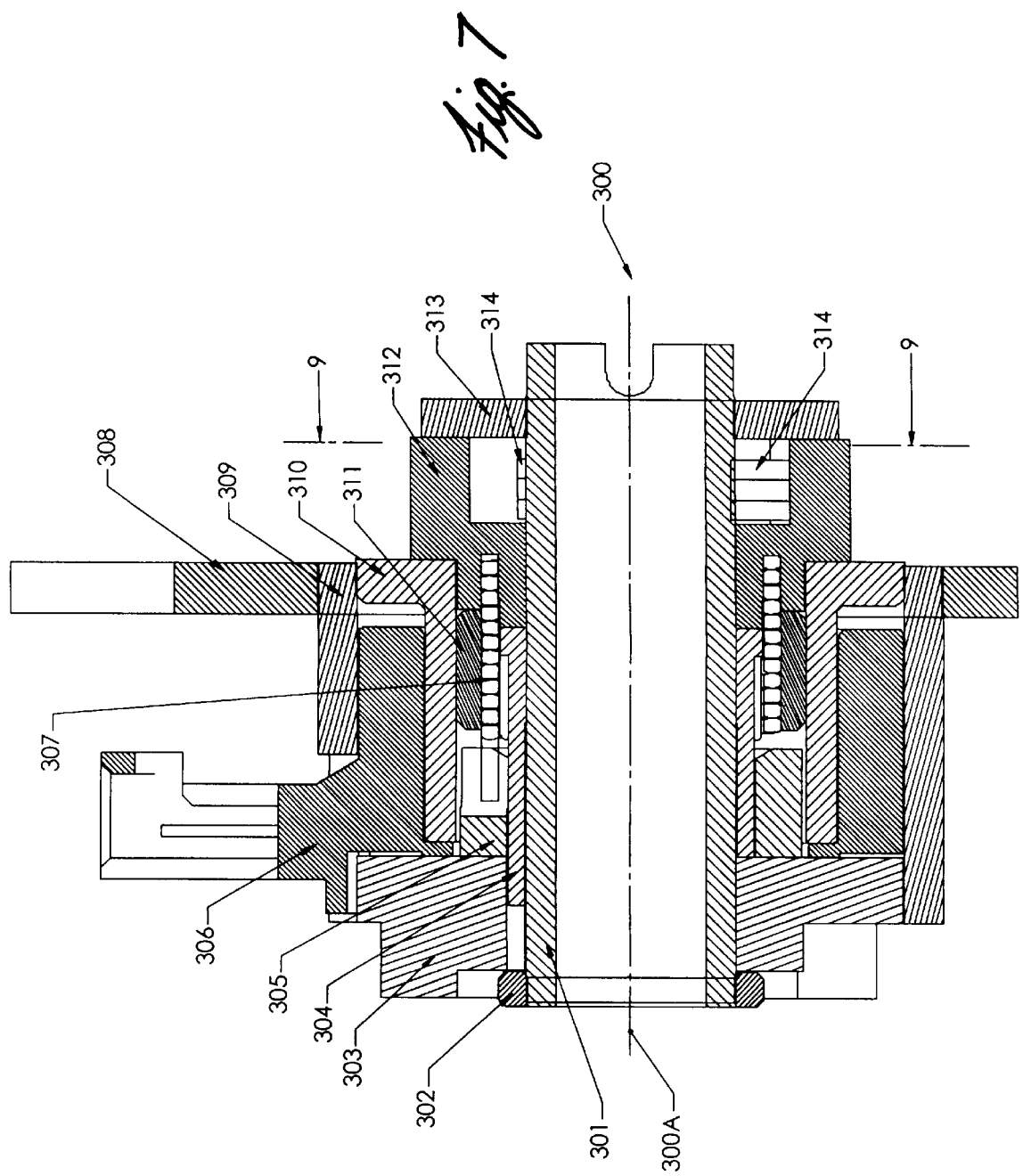
FIG. 7 is a longitudinal cross-sectional view of a third embodiment of the spring clutch.
Figure 8:
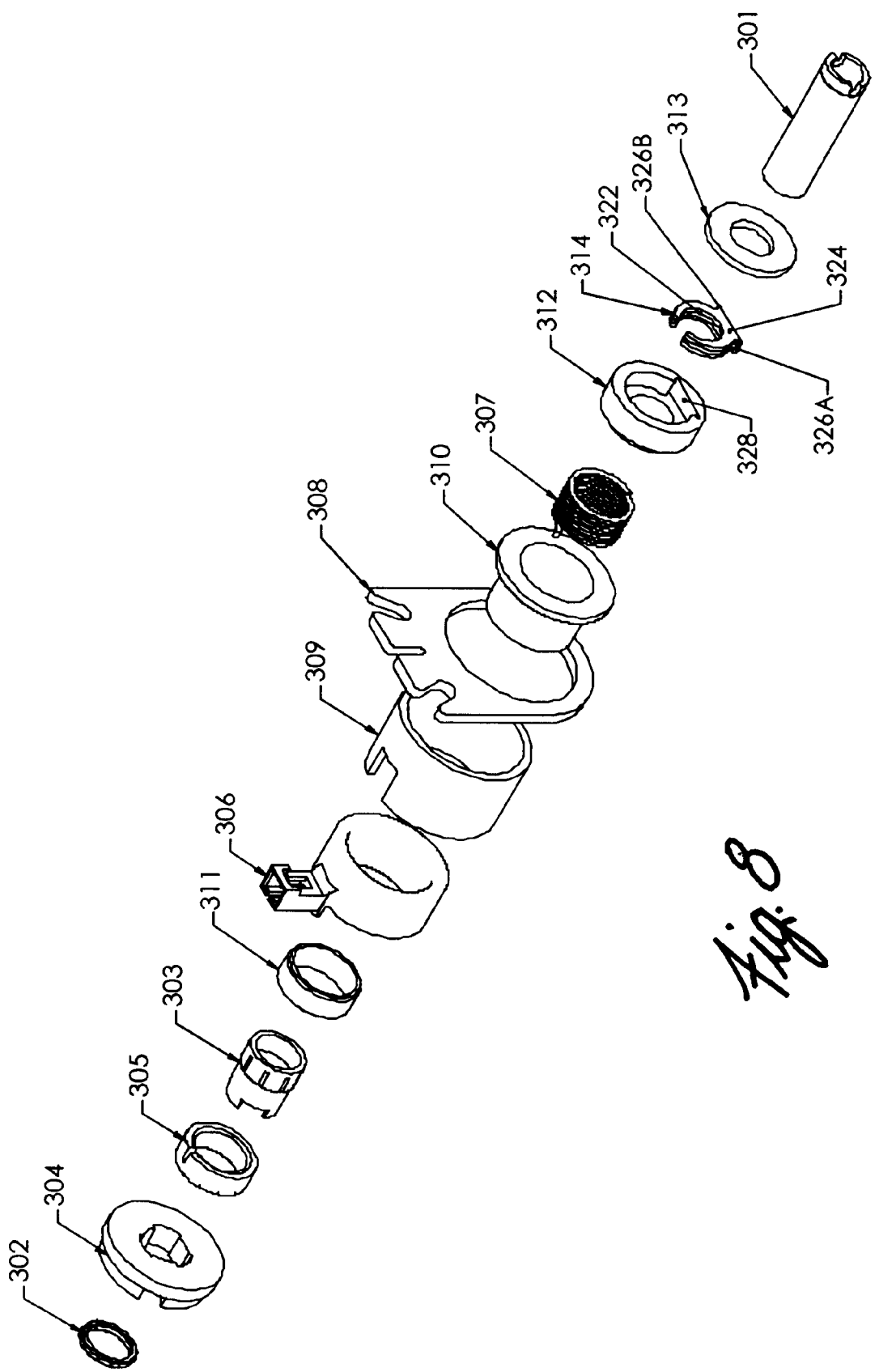
FIG. 8 is an exploded perspective view of the third embodiment of the spring clutch.
Figure 9:
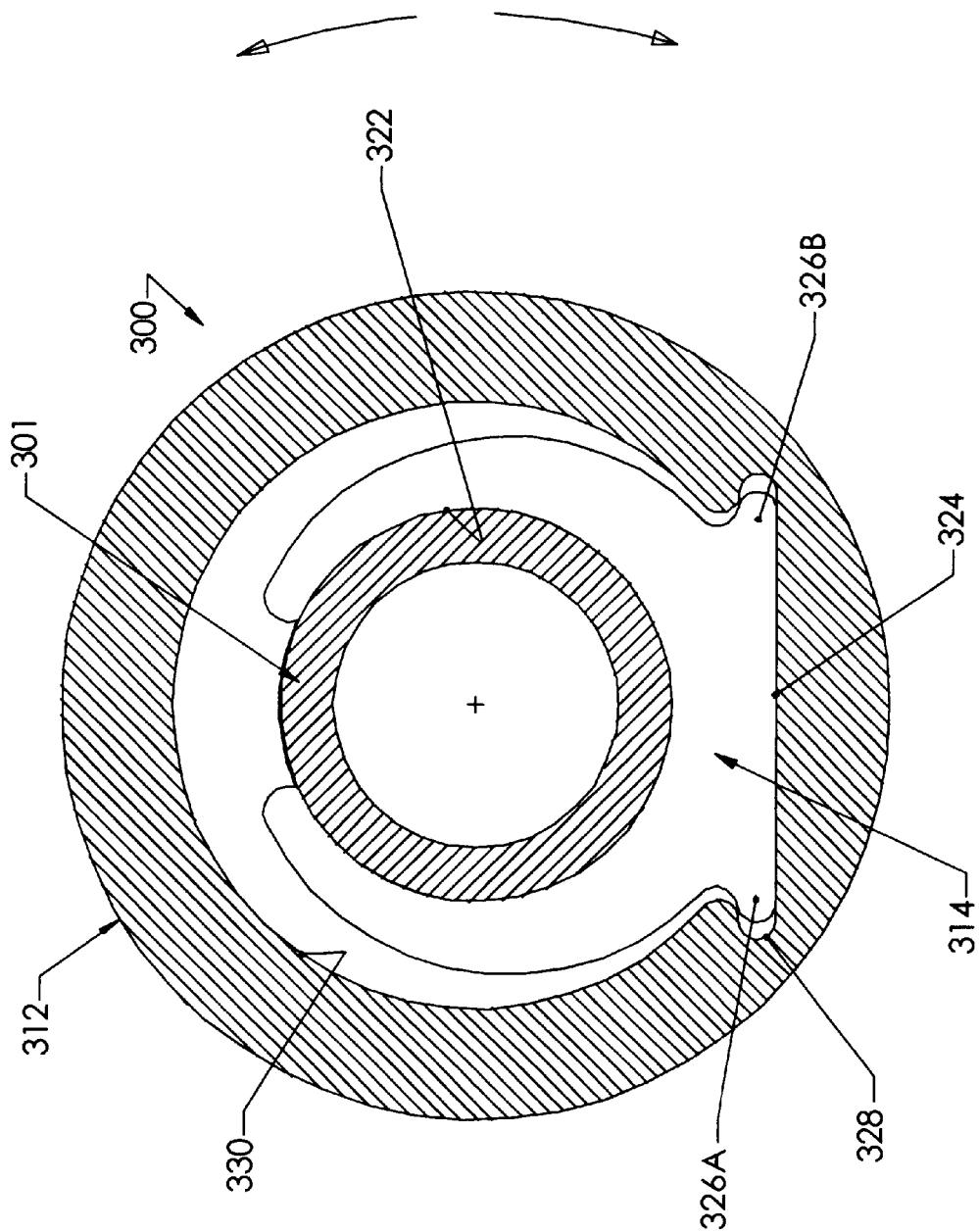
FIG. 9 is a lateral cross-sectional view of the third embodiment of the spring clutch.

A third embodiment of the inventive spring clutch is shown in FIGS. 7, 8 and 9 at 300. FIG. 7 is a cross-sectional view of spring clutch 300, and FIG. 8 is an exploded perspective view of the spring clutch 300. Spring clutch 300 includes longitudinal axis 300A along output shaft 301. Input shoulder 303 and input hub bearing 304 which is rotationally and fixedly joined with input shoulder 303 are disposed concentrically about shaft 301. Shoulder 303 and hub bearing 304 make up the "input member" portion of the spring clutch 300 and are driven by an external motive force (not shown). Ring 305 is disposed proximate to shoulder 303. Coil 306 (in one embodiment rated at 24 volts) is mounted proximate to shoulder 303 such that when coil 306 is energized, ring 305 is magnetically coupled to shoulder 303. Spring 307 is rotationally fixed to ring 305. Anti-rotation bracket 308, case 309, tube 310, and wrap hub 311 are interconnected preferably secured such that they do not move relative to ground. Sleeve 312 is fixably coupled to spring 307 and can freely rotate with respect to shaft 301. Spring 307 is initially biased (before energizing coil 306) so as to engage wrap hub 311 (i.e., in a "braking" position). Spring 307 and sleeve 312 form the "wrap spring assembly" and shaft 301 forms the "output member".

When ring 304 is magnetically engaged to shoulder 303, spring 307 is wrapped down onto hub bearing 304, due to the fixed connection of spring 307 to both ring 305 and sleeve 312. Torque is thereby transferred to sleeve 312 by spring 307. Sleeve 312 is fixably coupled to at least one slip clip 314.

As best shown in FIG. 9, inner diameter face 322 of the slip clips 314 is interference fit with an output shaft 301.

Sleeve 312 is secured in fixed rotational engagement with slip clip 34 by securing foot portion 324 having toes 326A and 326B into slot 328 formed in annular locking face 330 of sleeve 312. As sleeve 312 rotates, it engages foot 324 of slip clip 314, forcing slip clip 314 to rotate. Thus, the insertion of foot 324 into slot 328 provides a fixed rotational connection between slip clip 314 and sleeve 312. Once again, as the torque required to accelerate output shaft 301 (as when starting) or stop shaft 301 (as when ring 305 uncouples from shoulder 303 and spring 307 is in "braking" position) increases beyond the predetermined level (15 lb-in. in one embodiment) afforded by the interference fit between slip clip 314 and shaft 301, slip clip 314 will begin to "slip" with respect to shaft 301. The slip clips 314 thereby provide overload and line shock protection to the clutch 300.

During acceleration, once the torque required to turn shaft 301 drops below the predetermined level, the slip clip 314 stops "slipping" with respect to shaft 301 and shaft 301 is driven at substantially the same rotational speed as shoulder 303 and hub bearing 304. De-energizing coil 306 releases ring 305 from shoulder 303 allowing spring 307 to return to its original bias. Since spring 307 is biased so as to engage wrap hub 311, friction occurs between spring 307 and wrap hub 311. Thus, spring 307 is frictionally braked against the wrap hub 311 and by the interconnection with sleeve 312 the slip clip 314 brakes the shaft 301, in the reverse fashion as described with the acceleration of shaft 301.

Figure 10:
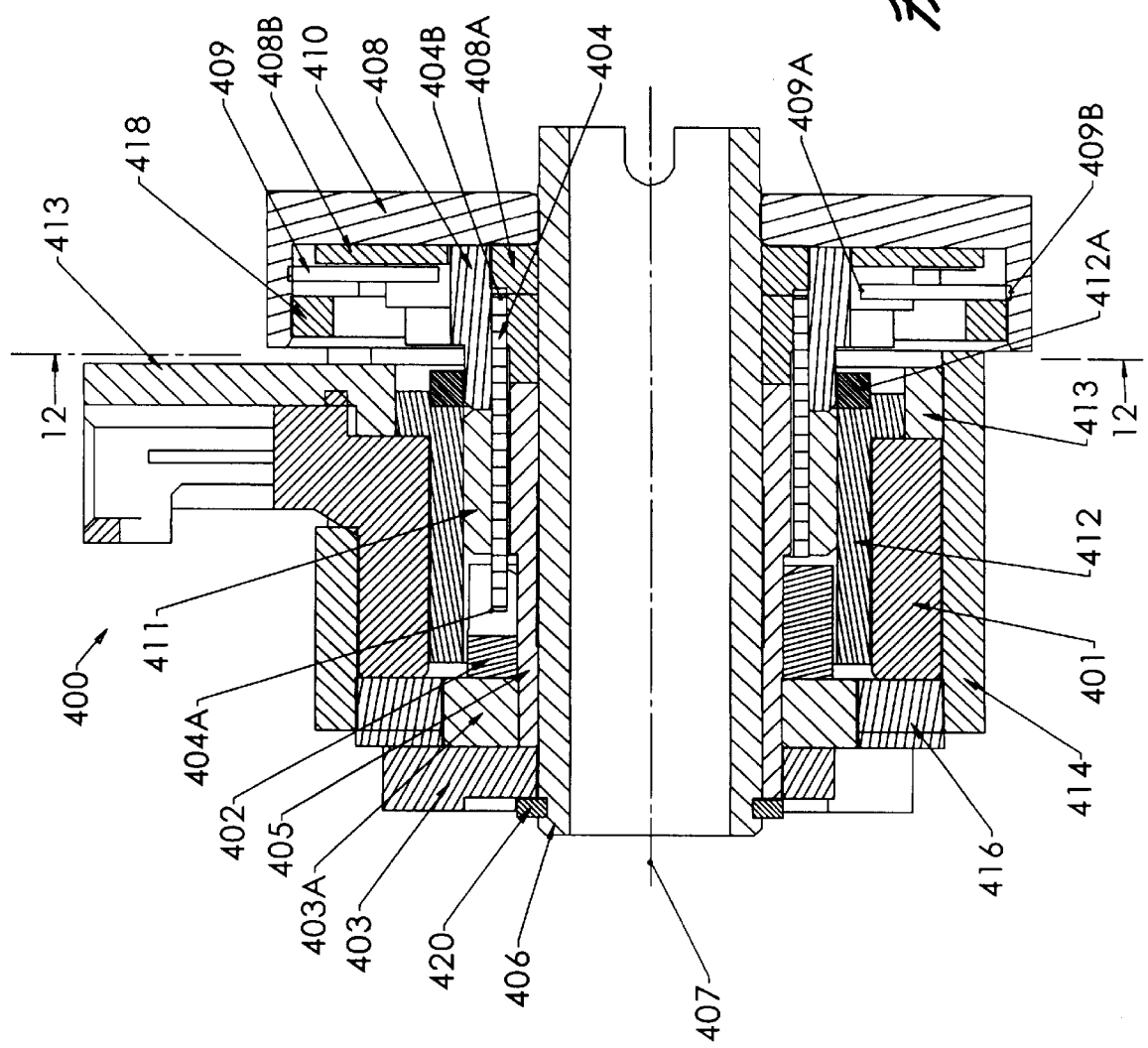
FIG. 10 is a longitudinal cross-sectional view of a fourth embodiment of the spring clutch.
Figure 11:
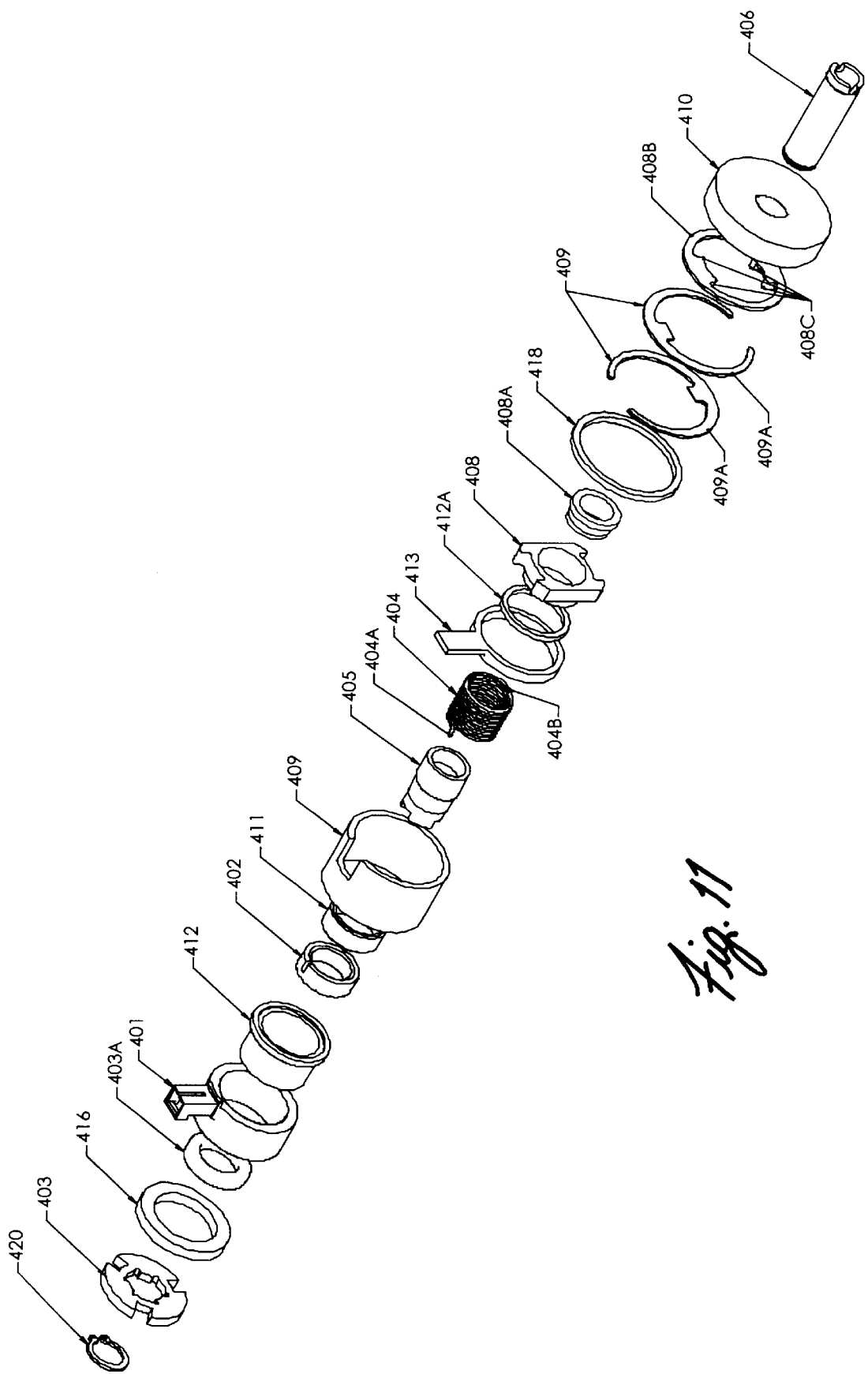
FIG. 11 is an exploded perspective view of the fourth embodiment of the spring clutch.
Figure 12:
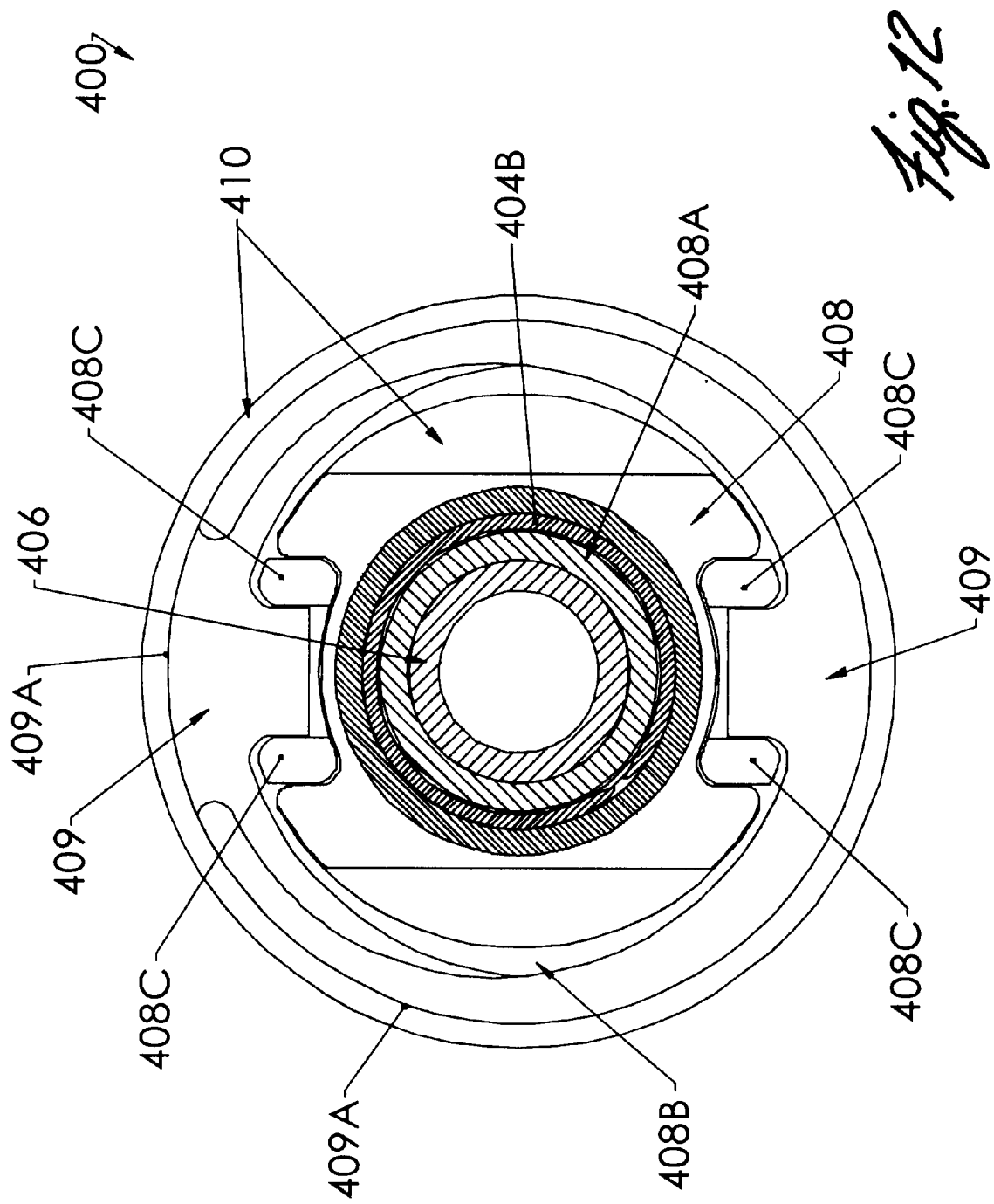
FIG. 12 is a lateral cross-sectional view of the fourth embodiment of the spring clutch.

A fourth embodiment of the inventive spring clutch is illustrated in FIGS. 10, 11 and 12 at 400. Similar to the embodiment discussed with respect to FIGS. 7, 8 and 9, the fourth embodiment uses coil 401 to magnetically couple ring 402 to hub 403 and hub shoulder 403A, as best shown in the cross-sectional view of FIG. 10 and the exploded perspective view of FIG. 11. Ring 402 is rotationally fixed to first spring end 404A of spring 404. Spring 404 is disposed coaxially about hub bearing 405. Hub bearing 405 is fixed rotationally with hub 403 and hub shoulder 403A. Shaft 406 is disposed along longitudinal axis 407 of clutch 400, radially inward from and coaxial to hub bearing 405. Shaft 406 rotates independently from hub 403, hub shoulder 403A and hub bearing 405. Second spring end 404B is fixed rotationally to drive sleeve 408. This coupling is accomplished by press fitting spring end 404B between drive sleeve 408 and inner sleeve 408A. Drive sleeve 408 is fixed rotationally to at least one slip clip 409 (discussed further with respect to FIG. 12). Washer 408B including locking tabs 408C (best shown in FIG. 11) maintains clips 409 in position between locking tabs 408C. Locking tabs 408C are integral with washer 408B. Thus, drive sleeve 408, inner sleeve 408A, washer 408B and clips 409 are all in fixed rotational engagement. Unlike the embodiment shown with respect to FIGS. 7, 8 and 9, outer diameter face 409B of slip clip 409 is interference fit, in this case with slip housing 410. Slip housing 410 is in fixed rotational engagement with shaft 406.

Hub 403, hub shoulder 403A and hub bearing 405 act as the "input member". Slip housing 410 and shaft 406 act as "output member". Spring 404, drive sleeve 408, inner sleeve 408A and washer 408B act as the "wrap spring assembly". Wrap hub 411 is made stationary (tied to ground) by being rotationally fixed with respect to tube 412, tube insert 412A, anti-rotation tab 413, case 414, case bushing 416 and coil 401. Placing anti-rotation tab 413 against a non-rotating external object (not shown) prevents the rotation of these interlocked members. Case bushing 416 allows the "input member" elements to rotate with respect to these grounded members. Housing insert 418 maintains the clips 409 axially within clip housing 410. Shaft 406 is locked axially to spring clutch 400 using retaining ring 420.

Spring 404 is initially biased against wrap hub 411. The initial bias of spring 404 (i.e., "unwrapped") against wrap hub 411 causes shaft 406 to be braked when ring 402 is not coupled to hub shoulder 403A. Once coil 401 is energized, ring 402 becomes magnetically coupled to hub shoulder 403A. An external drive (not shown) provides a rotational motive force to the hub 403, hub shoulder 403A and magnetically coupled ring 402. Spring 404, being fixed to ring 402 is coiled tighter (or "wrapped down") by the rotation of ring 402. Spring 404 disengages from wrap hub 411 (freeing it from frictional engagement with wrap hub 411), and onto hub bearing 405. The rotational force provided to spring 404 by frictional engagement with hub bearing 405 (as well as by ring 402) causes second spring end 404B to rotate drive sleeve 408 and inner sleeve 408A. Drive sleeve 408 is fixed in rotational coupling to slip clips 409, which are force to rotate with drive sleeve 408. The interference fit between outer diameter 409A of slip clip 409 and slip housing 410 results in there being a level of torque which will cause slip clip 409 to rotate with respect to slip housing 410, as best shown in FIG. 12. By varying the level of interference between the slip clip 409 and the slip housing 410 this torque level can be increased or decreased (i.e., making outer diameter 409A of slip clip 409 larger results in a higher level of torque being needed to rotate the slip clip 409 with respect to the slip housing 410 than if a smaller diameter slip clip 409 is used). Thus, a high torque suddenly applied to spring clutch 400 (above the pre-set or predetermined level) causes the slip clip 409 to "slip" thereby providing overload and line shock protection to the spring clutch 400.

Figure 13:
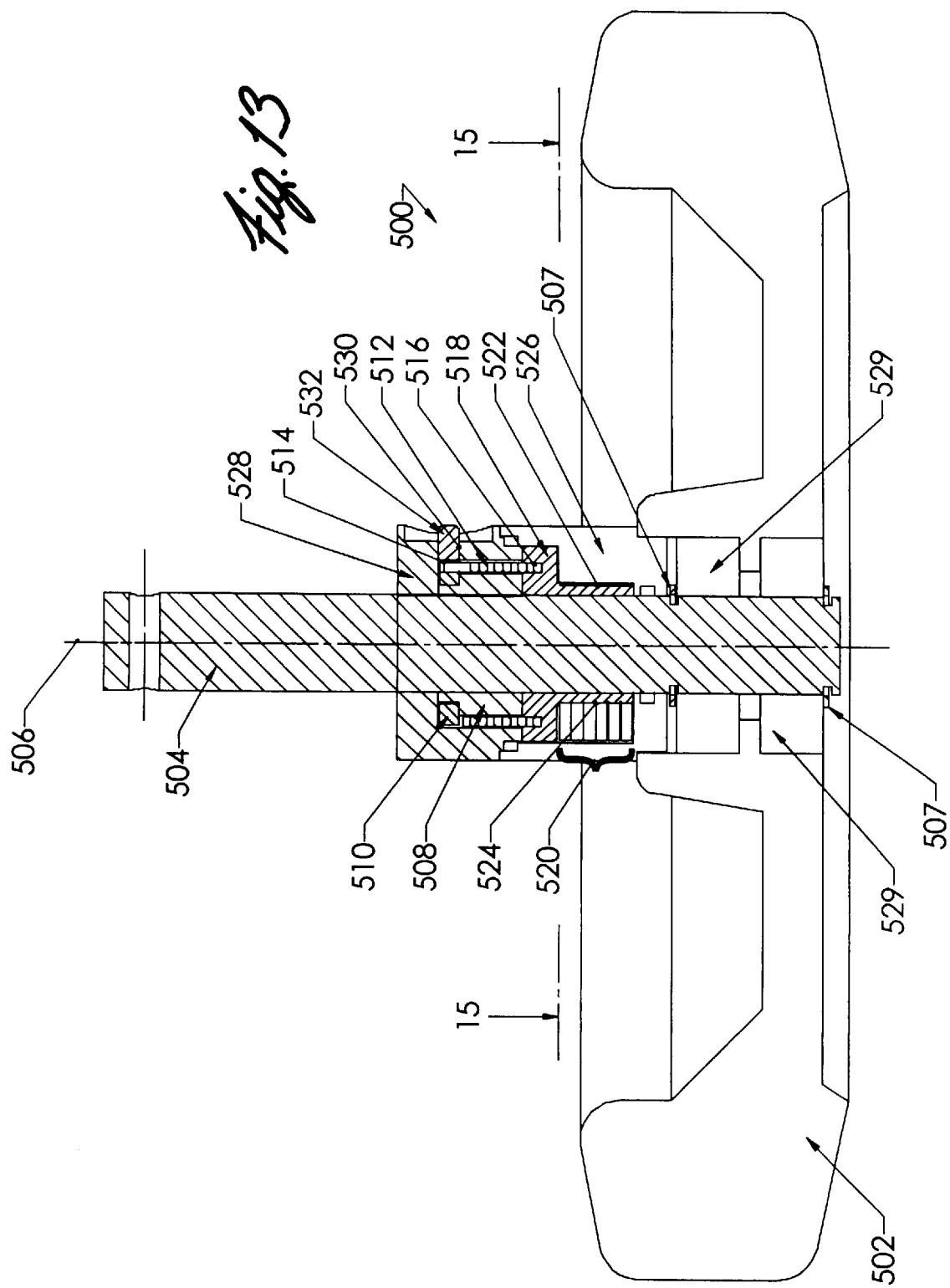
FIG. 13 is a longitudinal cross-sectional view of a fifth embodiment of the spring clutch.
Figure 14:
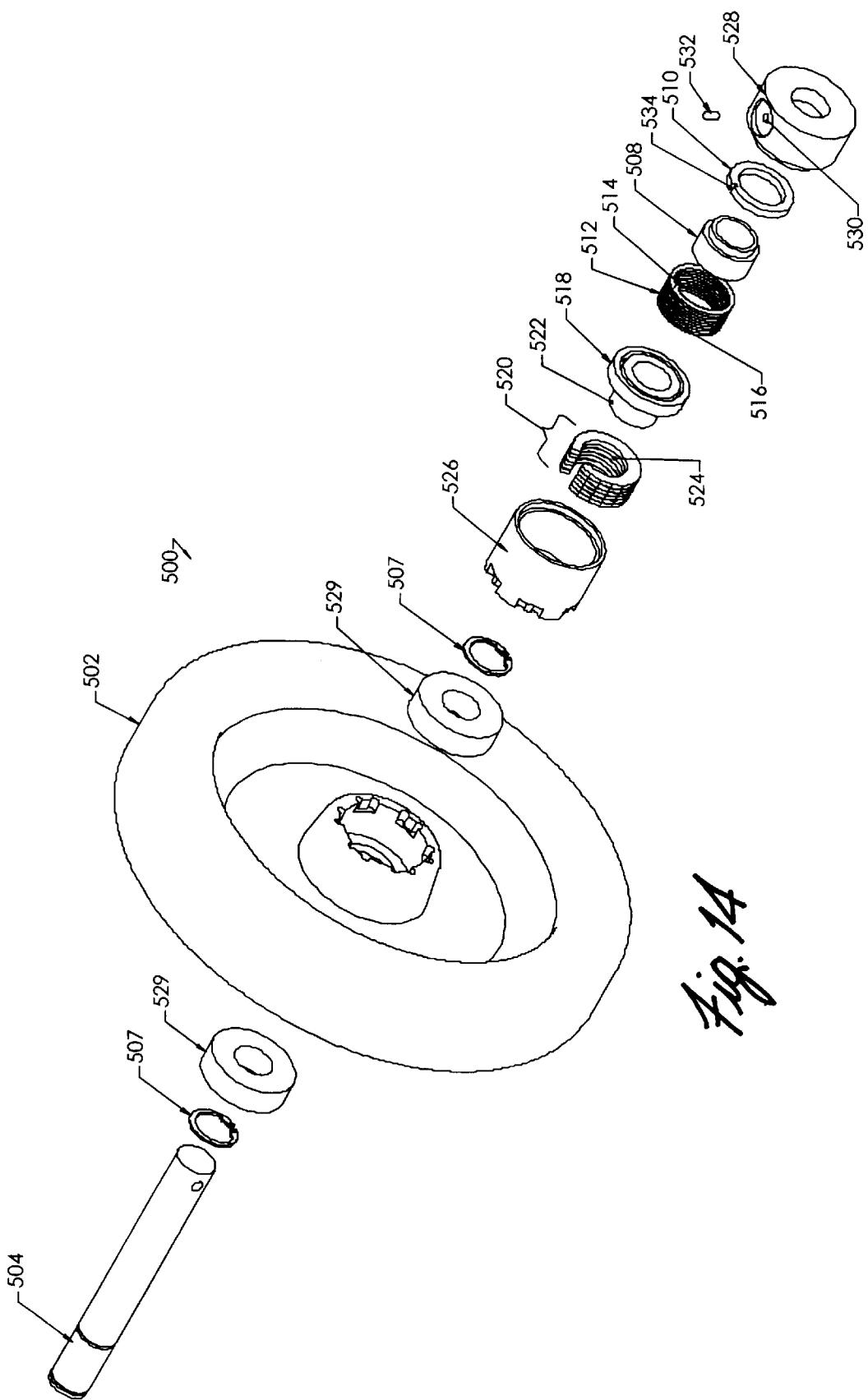
FIG. 14 is an exploded perspective view of the fifth embodiment of the spring clutch.

A fifth embodiment of spring clutch is illustrated at 500 in FIGS. 13, 14 and 15. This embodiment of spring clutch 500 illustrates the transferal of a braking force as the primary object of the spring clutch. Wheel 502 is rotatably connected to shaft 504. Shaft 504 is fixed rotationally (i.e., as part of a larger structure, such as a handcart (not shown)). Longitudinal axis 506 extends along shaft 504. Retaining rings 507 hold wheel 502 in place on shaft 504. Shaft hub 508 is disposed coaxially about shaft 504 and is in fixed rotational engagement with shaft 504 (i.e., tied to ground, or non-rotating). Control ring 510 is disposed annularly about shaft hub 508 and rotates freely with respect to shaft hub 508. Wrap spring 512 is also disposed annularly about shaft hub 508, proximate to control ring 510. First end 514 of wrap spring 512 is fixed to control ring 510. Second end 516 of wrap spring 512 is fixed to slip hub 518. Slip hub 518 is disposed annularly about and rotates freely with respect to shaft 504. At least one slip clip 520 is disposed about outer face 522 (six are illustrated). Thus, inner diameter face 524 of slip clips 520 is interference fit with outer face 522 of slip hub 518, to a pre-determined level of torque (as described with respect to the previous embodiments). Clip coupler 526 is annularly disposed about slip clips 520 and in fixed rotational engagement with slip clips 520. Clip coupler 526 is also in fixed rotational engagement with wheel 502. Housing 528 is disposed annularly about control ring 510, spring 512 and shaft 504 and is fixed rotationally with respect to shaft 504. Bearings 529 allow rotation of wheel 502 with respect to shaft 504. Aperture 530 extends radially through housing 528 so as to be in communication with control ring 510. Pin 532 is extendable through aperture 530 to engage control ring 510. Shaft 504, shaft hub 508 and housing 528 act as the "output member". Spring 512, control ring 510 and slip hub 518 act as the "wrap spring assembly", and wheel 502 and clip coupler 526 act as the "input member".

In operation, as wheel 502 is rotated (for example when the cart is being pushed or pulled) it forces the rotation of clip coupler 526 and slip clips 520. Since slip hub 518 is able to rotate freely about shaft 504, no torque is developed at the interference fit of outer face 522 of slip hub 518 and inner diameter face 524 of slip clips 520, and slip hub 518 is rotated by slip clips 520, along with wrap spring 512 and control ring 510. Pin 532 is disposed radially outward from control ring 510 in this "free-rolling" position.

By inserting pin 532 through aperture 530 into engagement with control ring 510, the rotation of control ring 510 can be prevented. Insertion and retraction of pin 532 can be accomplished using any number of mechanical methods, such as sheathed cables. Pin 532 engages control ring 510, preventing the rotation of control ring 510. Optionally, at least one notch 534 can be included on control ring 510 to engage pin 532. When wheel 502 is rotating in one direction (indicated by arrow 535A), spring 512 is "wrapped down" (i.e., coiled tighter) by the non-rotating control ring 510 and the rotating slip hub 518 attached to first and second ends 514 and 516, respectively of wrap spring 512. As spring 512 is coiled tightly onto shaft hub 508, the friction which develops between spring 512 and shaft hub 508 prevents spring 512 from rotating. Thus, slip hub 518 is prevented from rotating with respect to shaft 504. Alternatively, if wheel 502 is rotating in the opposite direction (indicated by arrow 535B), the spring is "unwound" and frictionally engages housing 528, preventing spring 512 and slip hub 518 from rotating. As discussed previously, if the torque formed between the rotating slip clips 520 and the non-rotating slip hub 518 exceeds a pre-determined level set by the level of interference fit as well as the slip clip configuration, then the inner diameter face 24 of the slip clips 520 will rotate with respect to slip hub 518. The ability to provide this protection when wheel 502 is rotating in either direction is enabled by the bi-directional nature of slip clips 520. Specifically, they are able to provide the same slip level when rotated in either direction. Additionally, this level can be increased by adding additional slip clips 520 (providing more interference between the slip clips 520 and the slip hub 518) or lessened by removing slip clips (decreasing the interference between the slip clips 520 and the slip hub 518).

The relationship between the slip clips 520, the slip hub 518 and the clip coupler 526 is shown in FIG. 15. Specifically, arms 536A and 536B of slip clip 520 are shown in fixed rotational engagement with clip coupler 526. Shoulder portion 538 of clip coupler 526 engages radially extending faces 540A and 540B on arms 536A and 536B, respectively. The slip clip 520 is able to provide rotational force in either rotational direction (indicated by arrows 542A and 542B). Internal face 524 of slip clip 520 is interference fit with outer surface 544 of slip hub 518 providing a level of static frictional engagement between the internal face 524 and the outer surface 544. This establishes a pre-determined level of torque (in one embodiment, approximately 100 lb-in.) at which the slip clip 520 will overcome the static friction formed at the interference fit and rotate with respect to the slip hub 518.

The kinetic friction between the slip clips 520 and slip hub 518 will still act to brake the rotation of slip clips 520 until the torque level drops below the pre-determined level. Thus, the fixed rotational relationship between slip clips 520, clip coupler 526 and wheel 502 brakes and stops the rotation of wheel 502. In the example of the hand cart, a user could stop the cart from rolling by releasing a handle (or alternatively squeezing a handle) which mechanically inserts pin 532 into notch 534 of control ring 510. If the cart is rolling, the wheels will be braked in a smooth fashion to a stop, avoiding a sudden jerking stop. If the cart is stationary, the wheels will be prevented from rotating except for a small amount of "play" afforded by the wrapping of the spring onto the shaft hub 508 or housing 528 (also called the "wrap angle").

As shown throughout the embodiments of the inventive spring clutch, torque slip clips used in the power train of the spring clutch greatly increase the performance characteristics of spring clutches. The torque slip clips can be used after the input member and before the spring or after the spring and before the output member. Additionally, either the outer diameter face or the inner diameter face can be interference fit in order to provide a "slip torque" level within the clutch. The predetermined level of slip torque provided by the slip clips allows a small package spring clutch to accommodate large torque spikes. Previously applications which experience torque spikes would have required a spring clutch that was oversized to prevent damage to the spring clutch components, increasing the weight and size of the end application.

Although the present invention has been described with reference to preferred embodiments, workers skilled in the art will recognize that changes may be made in form and detail without departing from the spirit and scope of the invention.

What is claimed is:

1. A spring clutch mechanism comprising:
a first member;
a second member coaxially disposed with respect to the first member wherein at least one of the first member and second member is rotatable;
a wrap spring assembly rotationally engaged with at least one of the first and second members; and
a first slip clip having an axial dimension and a radial dimension wherein the radial dimension is greater than the axially dimension, an outer axially extending surface and an axially extending aperture forming an inner axially extending surface, the first slip clip being disposed in rotational engagement between one of:
the first member and the wrap spring assembly, the first slip clip being interference fit with one of the first member and the wrap spring assembly and in fixed rotational engagement with the other of the first member and the wrap spring assembly; and
the second member and the wrap spring assembly, the first slip clip being interference fit with one of the second member and the wrap spring assembly and in fixed rotational engagement with the other of the second member and the wrap spring assembly;
wherein the interference fit of the first slip clip occurs along one of the outer and inner axially extending surfaces, such that the interference fit provides a predetermined level of rotational engagement along one of the outer and inner axially extending surfaces.

2. The spring clutch mechanism of claim 1 and further comprising:
a plurality slip clips in rotational engagement between one of the first member and the wrap spring assembly and the second member and the wrap spring assembly.

3. The spring clutch mechanism of claim 1 wherein the clip has an opening extending radially from the outer axially extending surface to the inner axially extending surface forming a first resilient arm having a first radially extending surface and a second resilient arm having a second radially extending surface.

4. The spring clutch of claim 3 wherein one of the first member, the second member and the wrap spring assembly is in fixed rotational engagement with the slip clip at the first radially extending surface of the slip clip.

5. The spring clutch of claim 3 wherein one of the first member, the second member and the wrap spring assembly is in fixed rotational engagement with the slip clip at the first radially extending surface and the second radially extending surface.

6. The spring clutch of claim 1 wherein the wrap spring assembly comprises:

a helical spring; and a means for connecting the helical spring to the slip clip.

7. The spring clutch of claim 6, wherein the slip clip includes an internal spar in fixed rotational engagement with the means for connection portion of the wrap spring assembly.

8. The spring clutch of claim 1 comprising:

a grounding hub, fixed rotationally and disposed proximate to the wrap spring assembly, wherein a spring portion of the wrap spring assembly is biased so as to frictionally engage the grounding hub so as to brake the rotation of the wrap spring assembly.

9. The spring clutch of claim 1, wherein the first member is an input member and the second member is an output member.

10. The spring clutch of claim 1, wherein the second member is an input member and the first member is an output member.

11. The spring clutch of claim 1, wherein the slip clip is interference fit along the inner axially extending surface.

12. The spring clutch of claim 1, wherein the slip clip is interference fit along the outer axially extending surface.

13. The spring clutch of claim 1, wherein the first member is in releasable rotational engagement with the wrap spring assembly and the wrap spring assembly is in fixed rotational engagement with the slip clip.

14. The spring clutch of claim 1, wherein the second member is in releasable rotational engagement with the wrap spring assembly and the wrap spring assembly is in fixed rotational engagement with the slip clip.

15. The spring clutch of claim 1, wherein the second member is in releasable rotational engagement with the wrap spring assembly and the wrap spring assembly is interference fit with the slip clip.

16. The spring clutch of claim 1, wherein the first member is in releasable rotational engagement with the wrap spring assembly and the wrap spring assembly is interference fit with the slip clip.

17. The spring clutch of claim 16, wherein the slip clip is interference fit along the outer axially extending surface.

18. The spring clutch of claim 16, wherein the slip clip is interference fit along the inner axially extending surface.

19. The spring clutch of claim 16, wherein the first member is an input member and the second member is an output member.

20. The spring clutch of claim 16, wherein the second member is an input member and the first member is an output member.

21. A spring clutch mechanism comprising:

a first member;

a second member coaxially disposed with respect to the first member wherein at least one of the first and second members is rotatable;

a wrap spring assembly in releasable rotational engagement with the first member such that the wrap spring assembly alternatively releases from and engages the first member independently of the direction of rotation of the first or second member; and at least one slip clip having an outer axially extending surface and an axially extending aperture forming an inner axially extending surface, the slip clip being disposed in rotational engagement between the second member and the wrap spring assembly.

22. The spring clutch of claim 21, wherein the wrap spring assembly is interference fit along the outer axially extending surface of the slip clip so as to provide a pre-determined level of rotational engagement between the wrap spring assembly and the slip clip, and wherein the second member is in fixed rotational engagement with the slip clip.

23. The spring clutch of claim 21, wherein the wrap spring assembly is interference fit along the inner axially extending surface of the slip clip so as to provide a pre-determined level of rotational engagement between the wrap spring assembly and the slip clip and wherein the second member is rotatably fixed to the slip clip.

24. The spring clutch of claim 21, wherein the wrap spring assembly is in fixed rotational engagement with the slip clip and the second member is interference fit along the outer axially extending surface of the slip clip so as to provide a predetermined level of rotational engagement between the wrap spring assembly and the slip clip.

25. The spring clutch of claim 21, wherein the wrap spring assembly is in fixed rotational engagement with the slip clip and the second member is interference fit along the inner axially extending surface of the slip clip so as to provide a predetermined level of rotational engagement between the wrap spring assembly and the slip clip.

26. The spring clutch of claim 21, wherein the slip clip provides a predetermined level of rotational engagement in a bi-directional manner along an interference fit with one of the outer and inner radially extending surfaces.

27. A method for transferring rotational energy comprising:

engaging a wrap spring assembly in rotational engagement with a first member;

rotationally coupling the wrap spring assembly with a second member through a first slip clip having a radial dimension greater than an axial dimension, so as to form a power transferring connection;

providing a first level of torque to the connection such that one of the wrap spring assembly and the second member slip rotationally with respect to the first slip clip along a radially extending face of the slip clip.

28. The method of claim 26 and comprising:

providing a second level of torque to the connection less than the first level of torque such that such that both the wrap spring assembly and the second member are in fixed rotational engagement with the first slip clip.

29. The method of claim 21 wherein the second level of torque has a maximum magnitude, and further comprising:

increasing the maximum magnitude of the second level of torque by including a second slip clip in the connection.

* * * * *